(12) United States Patent
Gu et al.

(10) Patent No.: US 9,333,835 B2
(45) Date of Patent: May 10, 2016

(54) HEATER FOR VEHICLES

(71) Applicant: HANON SYSTEMS, Daejeon (KR)

(72) Inventors: Jung Sam Gu, Daejeon (KR);
Hong-Young Lim, Daejeon (KR); Jun Young Song, Daejeon (KR); Kwang Hun Oh, Daejeon (KR); Young-Ha Jeon, Daejeon (KR); Yong Sung Kwon, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 351 days.

(21) Appl. No.: 13/937,548

(22) Filed: Jul. 9, 2013

(65) Prior Publication Data

US 2014/0008450 A1    Jan. 9, 2014

(30) Foreign Application Priority Data

Jul. 9, 2012 (KR) ............... 10-2012-0074474
Oct. 29, 2012 (KR) ............... 10-2012-0120162

(51) Int. Cl.

| B60H 1/03 | (2006.01) |
| --- | --- |
| B60H 1/22 | (2006.01) |
| F24H 9/18 | (2006.01) |
| H05B 3/14 | (2006.01) |
| H05B 3/50 | (2006.01) |
| F24H 3/04 | (2006.01) |
| F24H 3/12 | (2006.01) |

(52) U.S. Cl.
CPC .............. B60H 1/034 (2013.01); B60H 1/2225 (2013.01); F24H 3/0435 (2013.01); F24H 3/0441 (2013.01); F24H 3/0452 (2013.01); F24H 3/12 (2013.01); F24H 9/1872 (2013.01); H05B 3/145 (2013.01); H05B 3/50 (2013.01); *F24H 2250/04* (2013.01); *H05B 2203/009* (2013.01); *H05B 2203/02* (2013.01); *H05B 2203/023* (2013.01); *H05B 2214/04* (2013.01)

(58) Field of Classification Search
None
See application file for complete search history.

(56) References Cited

U.S. PATENT DOCUMENTS

| 1,546,958 | A | * | 7/1925 | Wilson | F02N 19/10 219/208 |
| --- | --- | --- | --- | --- | --- |
| 1,702,918 | A | * | 2/1929 | Rosenbluth | H05B 3/00 219/208 |
| 5,255,536 | A | * | 10/1993 | Jung | F25D 21/08 62/275 |
| 5,995,711 | A | * | 11/1999 | Fukuoka | B60H 1/00328 219/202 |
| 6,037,567 | A | * | 3/2000 | Inoue | B60H 1/2225 165/299 |
| 6,055,360 | A | * | 4/2000 | Inoue | B60H 1/00321 165/151 |
| 6,093,909 | A | * | 7/2000 | Beetz | B60H 1/2221 219/202 |
| 6,124,570 | A | * | 9/2000 | Ebner | B60H 1/00328 219/202 |
| 6,178,292 | B1 | * | 1/2001 | Fukuoka | F24H 1/009 165/175 |
| 7,667,164 | B2 | | 2/2010 | Bohlender et al. | |
| 7,971,799 | B2 | * | 7/2011 | Colette | B60H 1/2225 165/41 |
| 8,283,612 | B2 | * | 10/2012 | Keite-Telgenbuescher | B60R 1/0602 219/203 |

(Continued)

FOREIGN PATENT DOCUMENTS

| EP | EP 1370117 A2 * 12/2003 ............ F24H 3/0405 |
| --- | --- |
| JP | H10-148123 A    6/1998 |

(Continued)

*Primary Examiner* — Joseph M Pelham
(74) *Attorney, Agent, or Firm* — Novick, Kim & Lee, PLLC; Jae Youn Kim

(57) ABSTRACT

Provided is a heater for vehicles, and more particularly, to a heater for vehicles, in which a first heater heated by a flowing of engine cooling water and a second heater heated by a power supply are integrally assembled, thereby increasing spatial efficiency and more increasing heat exchange performance to improve heating performance.

24 Claims, 34 Drawing Sheets

(56) References Cited

U.S. PATENT DOCUMENTS

| | | | |
|---|---|---|---|
| 2004/0252986 A1* | 12/2004 | Ito | B60H 1/2225 392/485 |
| 2005/0205552 A1* | 9/2005 | Han | F24H 3/0405 219/540 |
| 2005/0242203 A1* | 11/2005 | Colette | B60H 1/2225 237/70 |
| 2006/0013574 A1* | 1/2006 | Ito | B60H 1/2225 392/485 |
| 2009/0057295 A1* | 3/2009 | Han | H05B 3/84 219/538 |
| 2009/0194525 A1* | 8/2009 | Lee | H05B 3/145 219/553 |
| 2010/0038356 A1* | 2/2010 | Fukuda | H01C 7/021 219/549 |
| 2010/0282729 A1* | 11/2010 | Taguchi | H05B 3/50 219/202 |
| 2011/0127247 A1* | 6/2011 | Choi | B60H 1/2225 219/202 |
| 2012/0118873 A1* | 5/2012 | Erismis | H05B 3/26 219/546 |
| 2013/0306622 A1* | 11/2013 | Gu | B60H 1/2225 219/534 |
| 2014/0008450 A1* | 1/2014 | Gu | B60H 1/034 237/12.3 R |
| 2014/0169776 A1* | 6/2014 | Kohl | B60H 1/2225 392/486 |
| 2015/0027799 A1* | 1/2015 | Omi | B60H 1/00592 180/274 |
| 2015/0043898 A1* | 2/2015 | Gu | H05B 3/20 392/360 |
| 2015/0060428 A1* | 3/2015 | Kim | B60H 1/2225 219/202 |

FOREIGN PATENT DOCUMENTS

| | | | |
|---|---|---|---|
| JP | 2005-297961 A | 10/2005 | |
| JP | 2007-278609 A | 10/2007 | |
| JP | 2009-196385 A | 9/2009 | |
| JP | 2009-255739 A | 11/2009 | |
| JP | 2010-040264 A | 2/2010 | |
| KR | 10-2005-0034997 A | 4/2005 | |
| KR | 10-2007-0005254 A | 1/2007 | |
| KR | 10-2011-0136094 A | 12/2011 | |
| WO | WO 2014119902 A1 * | 8/2014 | H05B 3/24 |

* cited by examiner

[Prior art]

[Prior art]

HEATER FOR VEHICLES

CROSS-REFERENCE TO RELATED APPLICATIONS

This application claims priority under 35 U.S.C. §119 to Korean Patent Application Nos. 10-2012-0074474, filed on Jul. 9, 2012 and 10-2012-0120162, filed on Oct. 29, 2012, in the Korean Intellectual Property Office, the disclosures of which are incorporated herein by reference in their entireties.

TECHNICAL FIELD

The present invention relates to a heater for vehicles, and more particularly, to a heater for vehicles, in which a first heater heated by a flowing of engine cooling water and a second heater heated by a power supply are integrally assembled, thereby increasing spatial efficiency and more increasing heat exchange performance to improve heating performance.

BACKGROUND

A heater, which is used to increase external temperature, has used various methods and has been used as various usages.

In particular, among heaters installed in a vehicle engine compartment, a heater serving to perform heating is configured to heat an interior of a vehicle by allowing a heat exchange medium used for lowering a temperature of an engine to circulate a heater core to heat external air.

However, among engines, a diesel engine has a high heat exchange rate, and thus requires a longer time to heat a heat exchange medium which cools an engine at the time of an initial starting of a vehicle, as compared with a gasoline engine.

Therefore, in case of a vehicle in which a diesel engine is mounted, the heating of the heat exchange medium is delayed after the initial starting during the winter season and thus an initial indoor heating performance may be degraded.

To solve the above-mentioned problem, an air heating heater for a vehicle, using a method of directly heating air ventilated to an interior of a vehicle using various devices has been proposed.

In this case, the air heating heater may more increase the heating performance by directly heating air, but occupies a space corresponding to a size of the heater under the situation in which it is difficult to secure a sufficient space in the engine compartment due to the tendency of miniaturization and high efficiency which may be a cause hindering the miniaturization.

In particular, a cartridge heater using a nichrome wire may not easily control temperature, when air is not ventilated to the heater, may overheat, have an insulating problem due to a high voltage, and have a risk of fire.

Further, an air conditioning device for a vehicle using a positive temperature coefficient (PTC) heater has been proposed in Japanese Patent Laid-Open Publication No. 2009-255739. Meanwhile, a PTC heater according to the related art is illustrated in FIG. 1.

In FIG. 1, an air flow direction is represented by an arrow and the PTC heater illustrated in FIG. 1 is configured to include a heat source unit 11 including a PTC element, a heat radiating unit 12 which effectively discharges heat by contacting the heat source unit 11, and a housing 20 which protects a terminal unit, the heat source unit 11, and the heat radiating unit 12 by enclosing them.

The PTC heater according to the related art may be different in terms of some of the detailed components, but as the heat source unit is formed in parallel with the air flow direction, the forming area of the heat source unit directly affects the heat radiating performance, such that there is a limitation of reducing a thickness (in the air flow direction) of the PTC heater.

In particular, in the PTC heater, since the electrical problem may occur when the heat radiating conditions are poor, the heat radiating unit including heat radiating fins is required. As a result, the manufacturing and assembling process of the heat radiating unit may be cumbersome and when the heat radiation is not effectively performed, the durability of the PTC heater may be generally degraded.

FIG. 2 illustrates an example of an air conditioning device for a vehicle using the PTC heater.

An air conditioning device 60 for a vehicle illustrated in FIG. 2 is configured to include a floor vent 31 of which the opening/closing degree is controlled by each door 31d, 32d, and 33d, an air conditioning case 30 in which a defrost vent 32 and a face vent 33 are formed, an evaporator 41 which is mounted in the air conditioning case 30 to cool air, a heater core 42 in which high-temperature cooling water flows to heat air, a PTC heater 43 mounted at a back side of the heater core 42 in the air flow direction, and a temperature door 50 which controls an opening/closing degree of a cooling air passage and a warming air passage.

In this case, the PTC heater is disposed to be spaced apart from the heater core by a predetermined distance and occupies a space in the air conditioning case as much, which may lead to degradation in spatial efficiency.

Further, since the PTC heater is mainly disposed at a central region of the heater core in a height direction to prevent a pressure of air from dropping, save costs, and the like, air passing through upper and lower regions in which the PTC heater is not disposed moves in the state in which air is not appropriately heated, thereby causing the degradation in heating performance.

A flow of air moving in which the air is not appropriately heated is represented by a dotted line arrow.

Therefore, a demand for development of a heater which can be directly heat exchanged with air, increase the heat exchange performance to more improve the heating performance, be miniaturized, be easily controlled, and prevent the problems caused by overheating to more improve safety has increased.

SUMMARY

An exemplary embodiment of the present invention is directed to providing a heater for vehicles, in which a first heater heated by a flowing of engine cooling water and a second heater heated by a power supply are integrally assembled, thereby increasing spatial efficiency and more increasing heat exchange performance to improve heating performance.

In one general aspect, there is provided a heater 1000 for vehicles, including: a first heater 100 which includes a first header tank 111 and a second header tank 112 spaced apart from each other by a predetermined distance and provided in parallel with each other, an inlet pipe 121 and an outlet pipe 122 which are respectively, alternatively disposed at the first header tank 111 and the second header tank 112 to have cooling water introduced and discharged thereinto and therefrom, and a plurality of tubes 130 fixed to the first header tank 111 and the second header tank 112 at both ends thereof to form a cooling water passage, and fins 140 inserted between the tubes 130; and a second heater 200 which includes a first support part 210 having a plate shape perpendicular to an air flow direction and including a first heat radiating region A210-1 and a first air flow region A210-2 provided with a plurality of first hollow parts 211 of which the predetermined region is perforated, a heat radiating unit 220 formed in the first heat radiating region A210-1 of the first support part 210 to radiate heat, a housing 240 supporting the first support part 210 and one end of the heat radiating unit 220, wherein the first support part 210 of the second heater 200 is formed in the region in which the tube 130 and the fins 140 of the first heater 100 are formed.

The heater 1000 for vehicles may further include: a first side plate 150 including a plate-shaped first plate part 151 and a second side plate 160 including a plate-shaped second plate part 161.

The first side plate 150 may be provided with first protrusions 152 protruding from both sides of the first plate part 151.

A predetermined region of the first protrusion 152 of one side of the first side plate 150 may be perforated with the first fastening part 153, a predetermined region of the housing 240 may be perforated with a second fastening part 244 to correspond to the first fastening part 153, and the first fastening part 153 and the second fastening part 244 may be fastened with a fastener 260 to fix the first heater 100 and the second heater 200.

The housing 240 may be provided with a first fixed part 241 fastened with the first protrusion 152 of one side of the first side plate 150 and an opposite side provided with the housing 240 of the first support part 210 and the second side plate 160 may be fixed by a second fixed part 250.

The first fixed part 241 may be provided with a groove into which the first protrusion 152 of the first side plate 150 is inserted and is formed to support the first protrusion 152.

The first fixed part 241 may be a second fixed hook 243 which is integrally formed in the housing 240.

The second side plate 160 may be provided with second protrusions 162 protruding from both sides of the second plate part 161.

The heater 1000 for vehicles may further include: a fixed body 251 integrally formed with the first support part 210 and a first fixed hook 252 extending from the fixed body 251 to be hung on the second protrusion 162 of one side of the second side plate 160 and a second fixed part 250 fixing an opposite side provided with the housing 240 of the first support part 210 and the second side plate 160.

The heater 1000 for vehicles may further include: a second fixed part 250 which is a separate fixed clip 255 simultaneously fixing an opposite side provided with the housing 240 of the first support part 210 and the second side plate 160 of the second side plate 160.

The second side plate 160 may extend to the second heater 200 side to support an opposite side provided with the housing 240 of the second heater 200.

The second heater 200 may be integrally formed at upper and lower ends thereof in a height direction and include a third fixed hook 270 hung on an outer circumferential surface of the first header tank 111 or the second header tank 112.

The second heater 200 may be formed on a surface of the first heater 100 side of the housing 240 and include a fourth fixed hook 272 fixed to enclose the inlet pipe 121 or the outlet pipe 122 of the first heater 100.

The heater 1000 for vehicles may further include: in order to support the other side of the heat radiating unit 220 together with the first support part 210 disposed at the first heater 100 side to support one side of the heat radiating unit 220, a second heat radiating region A230-1 which corresponds to a first heat radiating region A210-1 of the first support part 210 and a second support part 230 which is provided with a plurality of second hollow parts 231 adjacent to the second heat radiating region A230-1 and perforated in a predetermined region thereof and includes a second air flow region A230-2 corresponding to the first air flow region A210-2 of the first support part 210.

The heater 1000 for vehicles may further include: a first side plate 150 including a plate-shaped first plate part 151 and a second side plate 160 including a plate-shaped second plate part 161.

The heater 1000 for vehicles may further include: a second fixed part 250 which is hung on the second protrusion 162 protruding to one side of the second plate part 161 of the second side plate 160 by extending the end of the second support part 230 at an opposite side provided with the housing 240 to the second side plate 160 side.

The second side plate 160 may extend to the second heater 200 side to support an opposite side provided with the housing 240 of the second heater 200.

The heater 1000 for vehicles may further include: a header extension 113 formed by extending a header of the first header tank 111 or the second header tank 112 to the second heater side, wherein the header extension 113 supports and fixes both ends of the second heater 200 in a height direction.

The heater 1000 for vehicles may further include: a lower housing 280 coupled with the first support part 210 and the second support part 230 of an opposite side provided with the housing 240, a first groove part 281 formed on one side of the lower housing 280 is inserted with one side of the first support part 210 in a width direction, and a second groove part 282 formed on the other side of the lower housing 280 is inserted with both corners of the second support part 230 in a height direction, wherein the second groove part 282 is inserted with the second protrusion 162 protruding to one side of the second plate part 161 of the second side plate 160 together with the first support part 210.

The first support part 210 and the second support part 230 may be each provided with a first louver fin 212 and a second louver fin 232 which protrude by cutting predetermined regions corresponding to the first support part 210 and the second support part 230, respectively and bending each cut region in a direction opposite to a side coupled with the first heater 100.

The heat radiating part 220 may include: a heat radiating tube 225 that is coupled with the first heat radiating region A210-1 of the first support part 210; an insulating support 226 which is provided in the heat radiating tube 225 and provided with a space part 226a; a positive temperature coefficient (PTC) element 227 which is provided in the space part 226a of the insulating support 226; and an electrode 228 which is disposed in the insulating support 226.

The heat radiating part 220 may include: a PTC element 227, an insulating support 226 which is provided with a space part 226 formed to correspond to the first heat radiating region A210-1 and a second heat radiating region A230-1 and hollowed to seat the PTC element 227 seated therein, and a first electrode 228-1 which applies power to the PTC element 227.

The heat radiating part 220 may include: a first seating part 226b of which the surface corresponding to the first heat radiating region A210-1 of the insulating support 226 is stepped to the space part 226a side and the first electrode 228-1 is seated in the first seating part 226b of the insulating support 226.

The heat radiating part 220 may include: a second seating part 226c of which the surface corresponding to the second heat radiating region A230-1 of the insulating support 226 is stepped to the space part 226a side, and the second seating part 226c of the insulating support 226 is further provided with a second electrode 228-2.

The heat radiating part 220 may include: a first insulating layer 229-1 and a second insulating layer 229-2 which are further formed on a contact surface of the first support part 210 and the second support part 230.

DETAILED DESCRIPTION OF MAIN ELEMENTS

Figure 1:
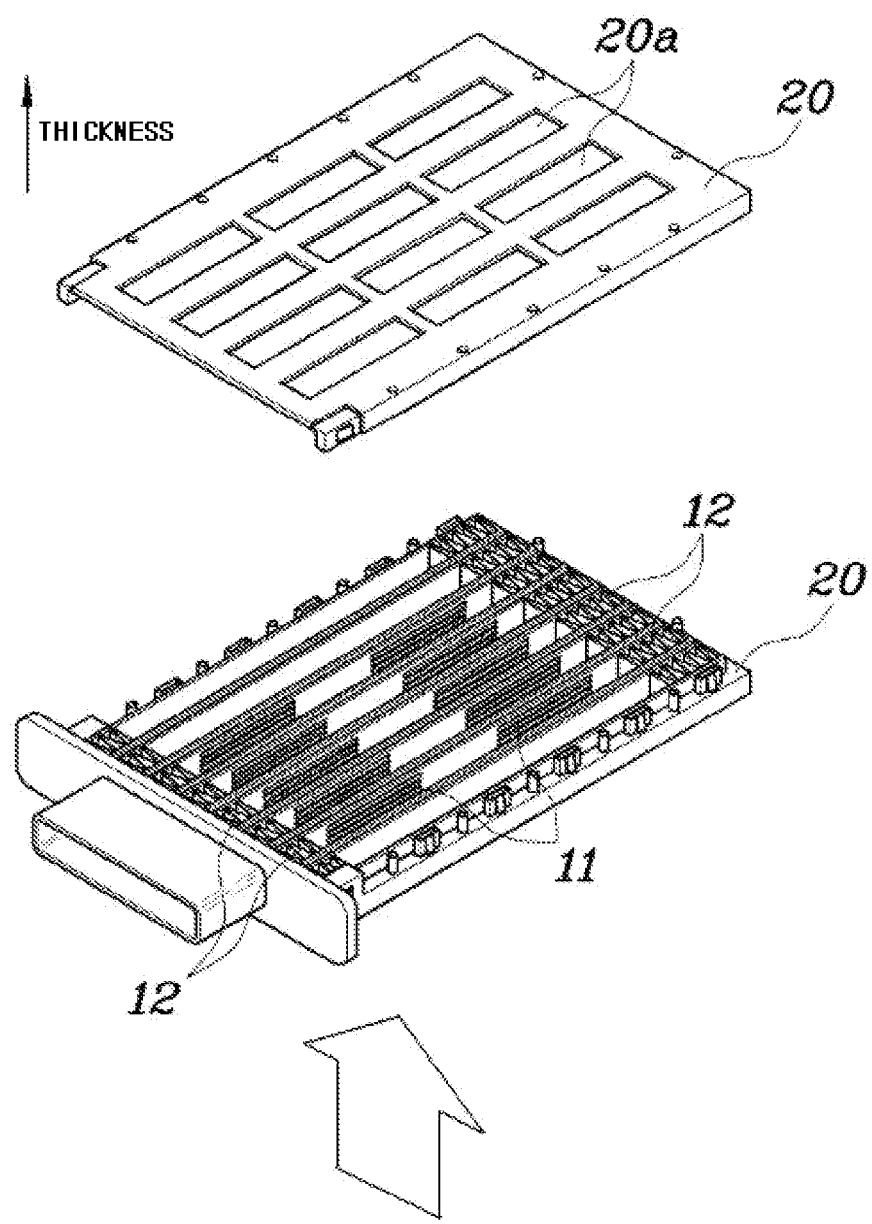
FIG. 1 is a view illustrating a PTC heater according to the related art.
Figure 2:
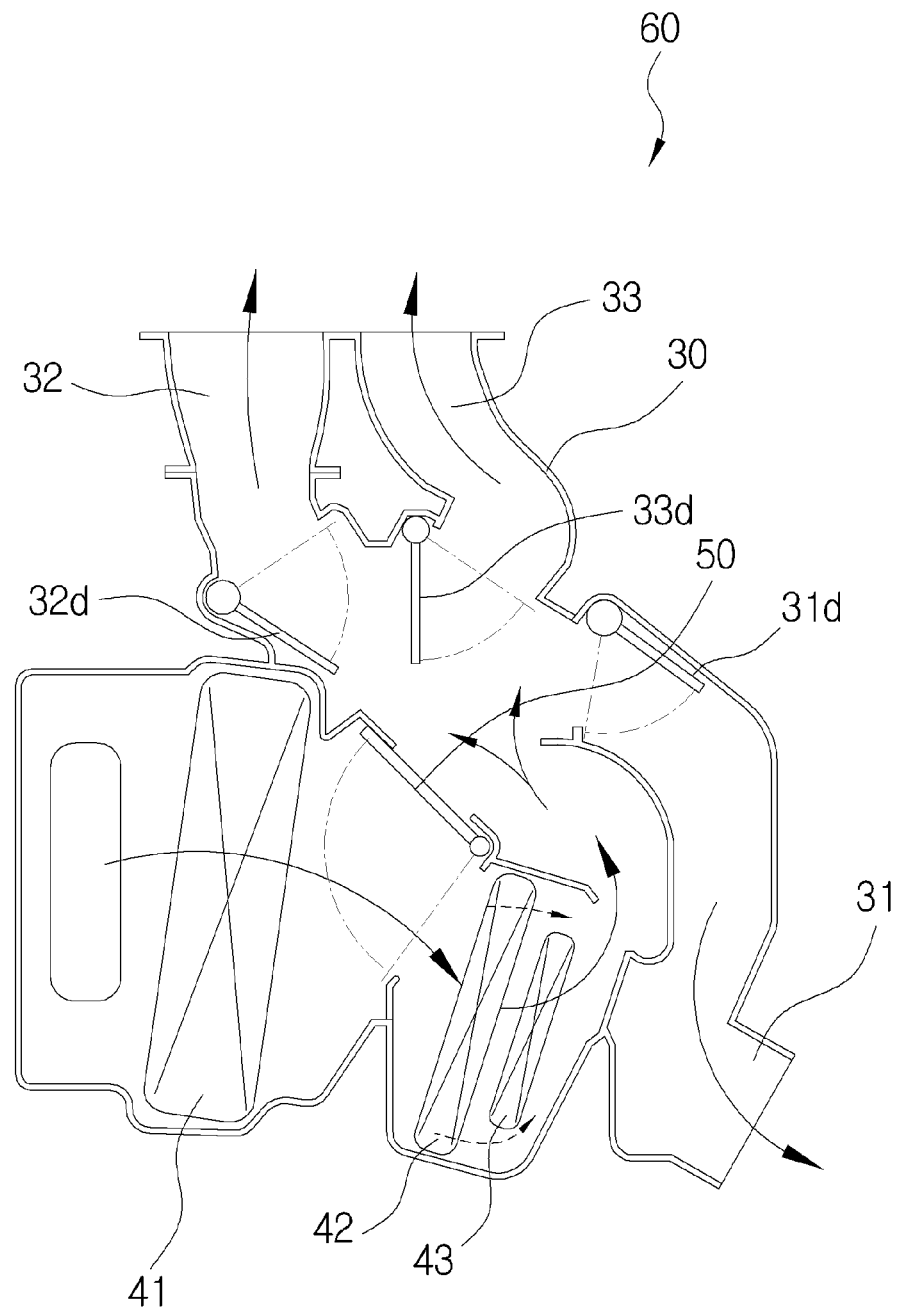
FIG. 2 is a diagram illustrating a general air conditioning device for a vehicle.

1000: Heater for vehicles
100: First heater
111: First header tank
112: Second header tank
113: Header extension
121: Inlet pipe
122: Outlet pipe
130: Tube
140: Fin
150: First side plate
151: First plate part
152: First protrusion
153: First fastening part
160: Second side plate
161: Second plate part
162: Second protrusion
163: Extension
200: Second heater
210: First support part
211: First hollow part
212: First louver fin
A210-1: First heat radiating region
A210-2: First air flow region
220: Heat radiating unit
D220: Thickness of heat radiating unit
221: Insulating layer
222: Electrode
223: Tube heat radiating layer
224: Protective layer
225: Heat radiating tube
226: Insulating support
226a: Space part
226b: First seating part
226c: Second seating part
227: PTC element
228-1: First electrode
228-2: Second electrode
229-1: First insulating layer
229-2: Second insulating layer
230: Second support part
231: Second hollow part
232: Second louver fin
A230-1: Second heat radiating region
A230-2: Second air flow region
240: Housing
241: First fixed part
242: Inclined part
243: Second fixed hook
244: Second fastening part
250: Second fixed part
251: Fixed body
D251: Thickness of fixed body
252: First fixed hook
253: First bent part
254: Second bent part
255: Fixed clip
260: Fastener
271: Third fixed hook
272: Fourth fixed hook
280: Lower housing 281: First groove part
282: Second groove part
300: Air conditioning case
310: Floor vent
310d: Floor vent door
320: Defrost vent
320d: Defrost vent door
330: Face vent
330d: Face vent door
400: Temperature door
500: Evaporator

DETAILED DESCRIPTION OF EMBODIMENTS

Hereinafter, a heater 1000 for vehicles according to exemplary embodiments of the present invention having the above-mentioned characteristics will be described in detail with reference to the accompanying drawings.

The heater 1000 for vehicles according to the exemplary embodiment of the present invention has a structure in which a first heater 100 in which cooling water flows and a second heater 200 heated by a power supply are assembled, which are assembled by various methods.

The first heater 100 will be first described.

The first heater 100 is configured to include a first header tank 111 and a second header tank 112, an inlet pipe 121 and an outlet pipe 122, a tube 130, a fin 140, a first side plate 150, and a second side plate 160.

The first header tank 111 and the second header tank 112 are spaced apart from each other by a predetermined distance and provided in parallel with each other, and the first header tank 111 and the second header tank 112 is each, alternately connected with the inlet pipe 121 in which cooling water flows and an outlet pipe 122 through which cooling water is discharged.

Both ends of the tube 130 are fixed to the first header tank 111 and the second header tank 112 to form a cooling water channel. A plurality of tubes 130 can be fixed to the first and second header tanks 111, 112 in parallel with each other.

The fin 140 is inserted between the tubes 130 to increase a contact area of air.

The first side plate 150 and the second side plate 160 have both ends fixed to the first header tank 111 and the second header tank 112 and are a portion supporting both sides of an assembly of the tube 130 and the fin 140 and are configured to each include a first plate part 151 and a second plate part 161.

The first plate part 151 and the second plate part 161 are formed in a plate-shape for supporting both sides of the assembly of the tube 130 and the fin 140, and the first side plate 151 is provided with a pair of first protrusions 152 formed at both sides of the first plate part 151.

Figure 4:
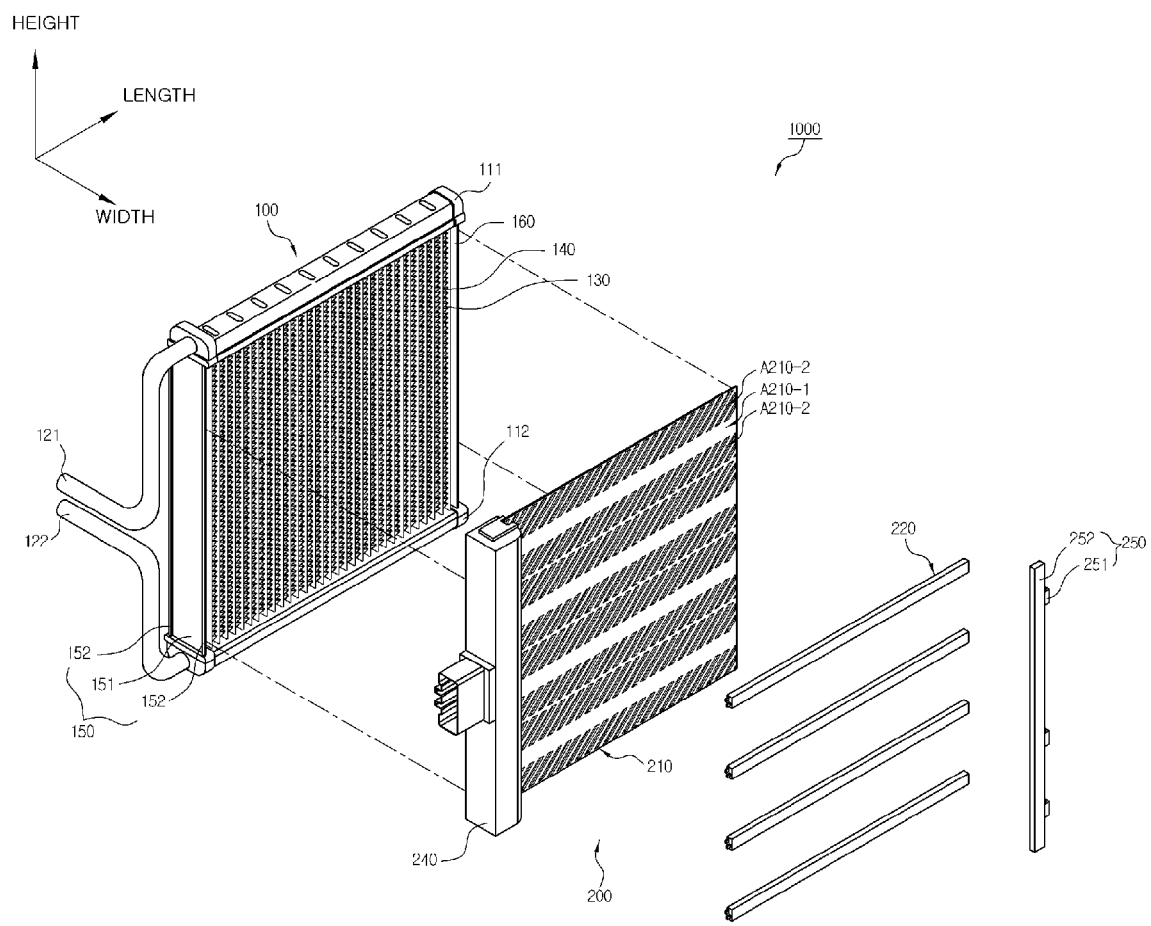
Figure 5:
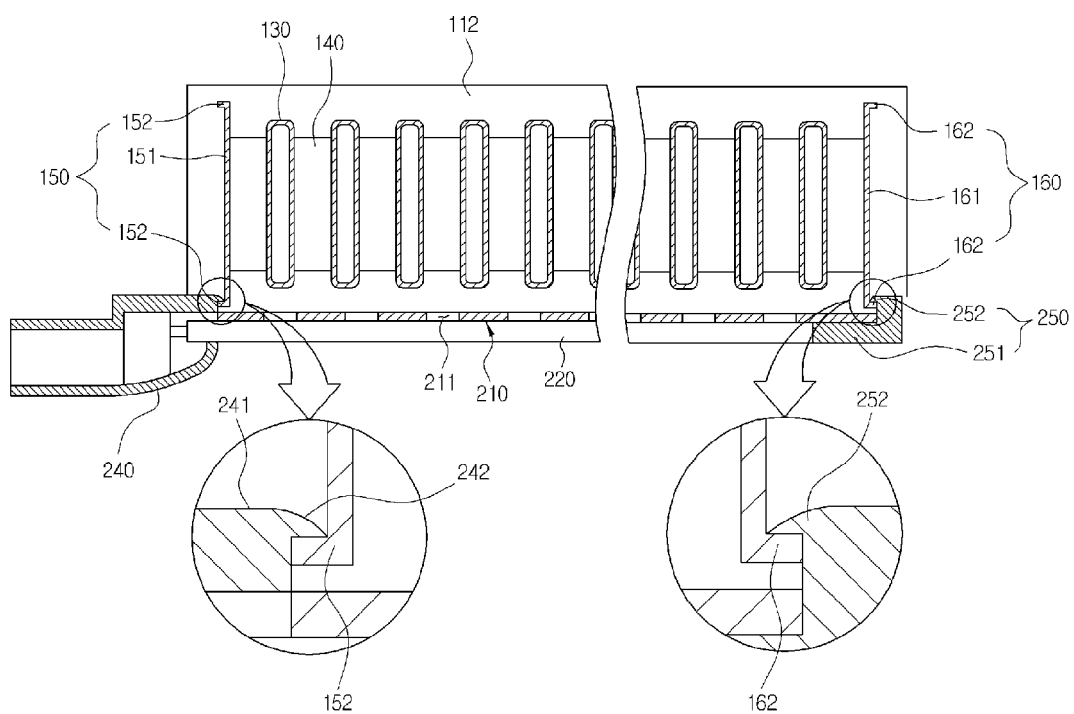
FIG. 5 is a cross-sectional view of the heater for vehicles illustrated in FIG. 3 taken along the direction aa'.

The first protrusion 152 is formed by allowing both ends of the first plate part 151 to extendedly protrude in the length direction as shown in FIGS. 4 and 5.

Similarly to the first side plate 150, the second side plate 160 includes the second protrusion 162 formed by allowing both ends of the second plate part 161 to extendedly protrude in a direction opposite to that of the first protrusion 152 as shown in FIGS. 4 and 5.

Further, the second side plate 160 may have a form in which the second protrusion 162 is formed only at one side of the second plate part 161.

In the heater 1000 for vehicles according to the exemplary embodiment of the present invention, the second heater 200 is fixed to the first heater 100 using the first side plate 150 and the second side plate 160 of the first heater 100, which will be described below in more detail.

The second heater 200 is configured to include a first support part 210, a heat radiating unit 220, and a housing 240.

The first support part 210 has a plate shape and is perpendicularly disposed to the air flow direction.

In other words, the first support part 210 is a basic body part forming the second heater 200 and is formed to have a size corresponding to a tube 130 and fin 140 forming a region of the first heater 100 to pass air through the first heater 100 and the entire region of the first support part 210 of the second heater 200 to be uniformly heated.

The first support part 210 is configured to include a first heat radiating region A210-1 and a first air flow region A210-2, in which the first heat radiating region A210-1 is a region in which the heat radiating unit 220 is formed and the remaining first air flow region A210-2 is a region in which air flows.

The first air flow region A210-2 is a region in which a plurality of first hollow parts 211 of which predetermined regions are perforated is formed and the shape and number of first hollow parts 211 may be various.

The heat radiating unit 220 is a component heated by a power supply and is formed in the first heat radiating region A210-1 of the first support part 210.

The heat radiating unit 220 may be configured to be heated by various methods and as in the detailed exemplary embodiments. Specifically, as illustrated in FIG. 13, a carbon nano tube may be used and as illustrated in FIG. 14, a heat radiating tube 225 including a positive temperature coefficient (PTC) element 227 may be used.

Figure 13:
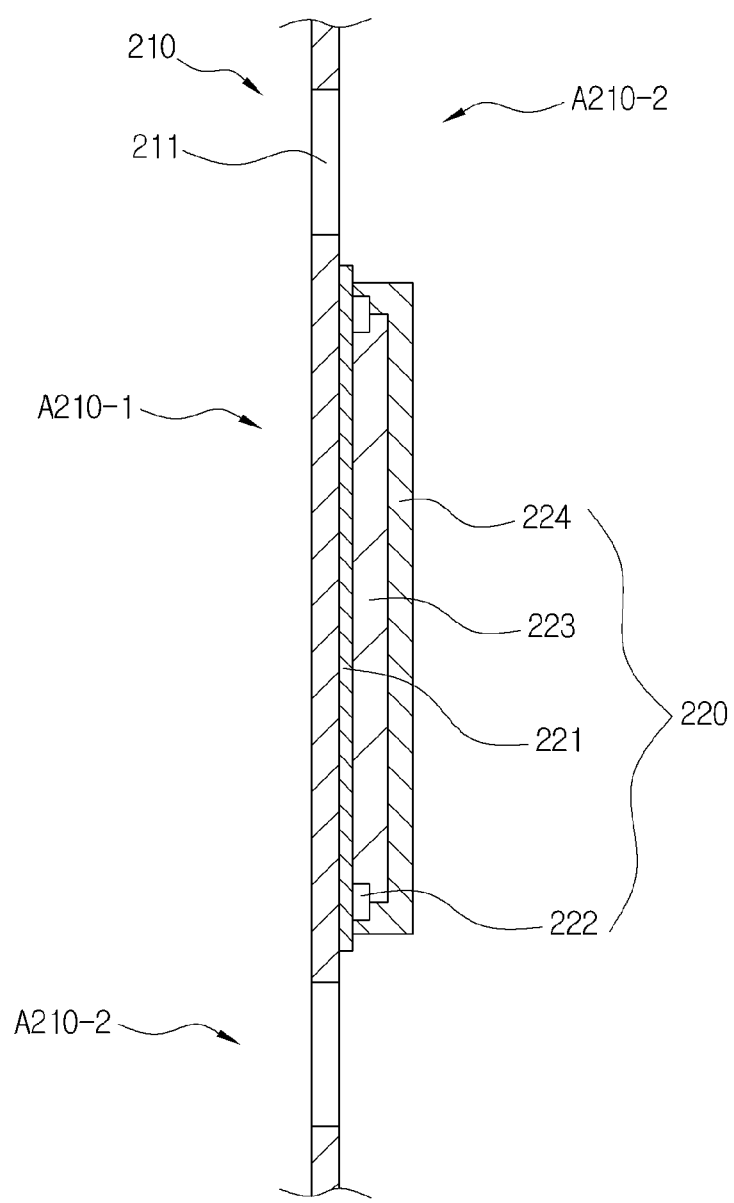
FIGS. 13 and 14 each are diagrams illustrating a second heater heat radiating unit of the heater for vehicles according to the exemplary embodiment of the present invention.
Figure 14:
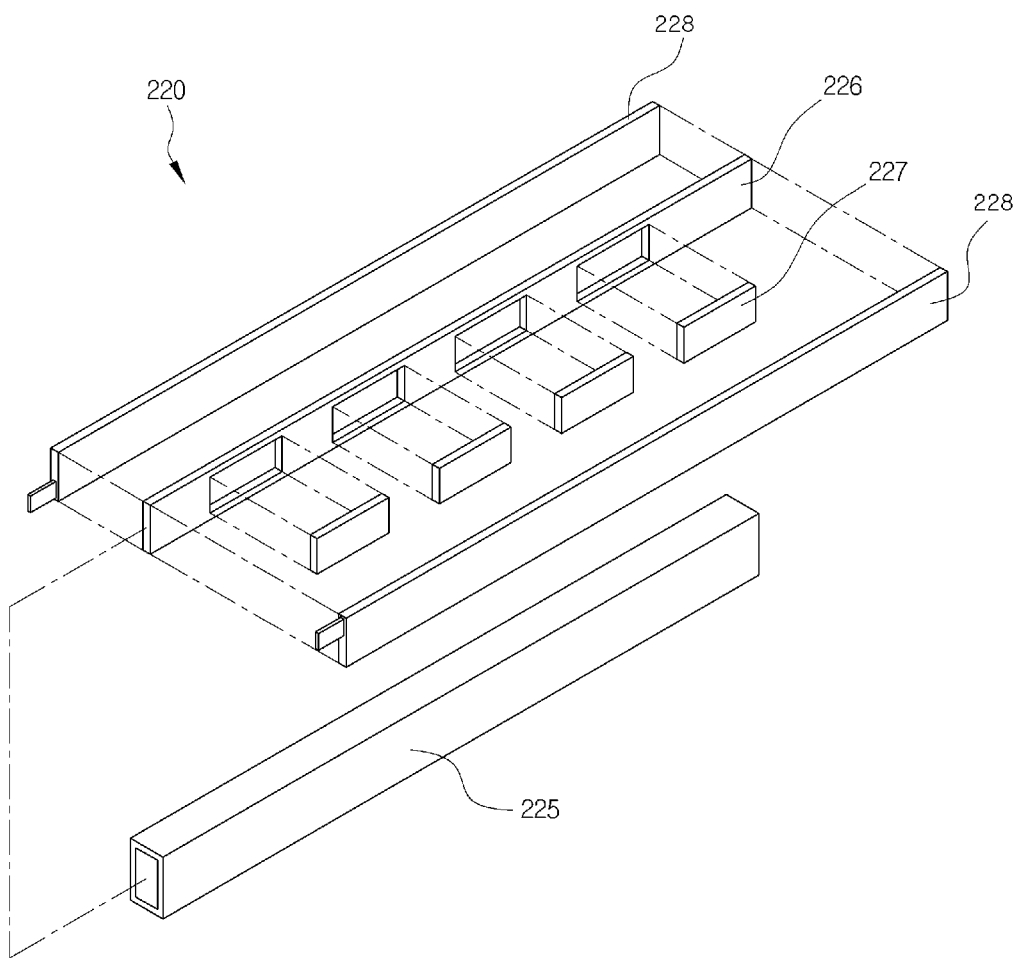

Referring to FIG. 13, when the heat radiating unit 220 is a structure having the carbon nano tube, components for using the carbon nano tube may be directly coated in the first heat radiating region A210-1 of the first support part 210.

In more detail, the heat radiating unit 220 having the carbon nano tube may be configured to include an insulating layer 221 which is formed in the first heat radiating region A210-1, a pair of electrodes 222 which is extendedly formed in a height direction on both ends of the insulating layer 221, a carbon nano tube heat radiating layer 223 formed on the insulating layer 221 to be conducted with the electrodes 222, and a protective layer 224 formed to enclose the electrodes 222 at both ends of the insulating layer 221 and the carbon nano tube heat radiating layer 223.

In the structure illustrated in FIG. 13, the heat radiating unit 220 having the carbon nano tube is directly coated in the first heat radiating region A210-1 of the first support part 210, thereby more improving the durability and improving the manufacturing performance.

The heat radiating unit 220 illustrated in FIG. 14 illustrates an example of using the heat radiating tube 225 having the PTC element 227 embedded therein.

In the heat radiating unit 220 illustrated in FIG. 14, the heat radiating tube 225 may be bonded to the first heat radiating region A210-1 of the first support part 210 by using a heat conductive adhesive.

In this case, the heat radiating unit 220 may be configured to include the heat radiating tube 225, an insulating support 226 which is provided in the heat radiating tube 225 and is provided with a plurality of space parts 226a in a width direction, a PTC element 227 provided in the space part 226a of the insulating support 226, and an electrode 228 disposed in the insulating support 226.

The heater 1000 for vehicles according to the exemplary embodiment of the present invention may have more various structures in which the heat radiating unit 220 of the second heater 200 is heated by various methods other than an example described above.

The housing 240 supports the first support part 210 and one end of the heat radiating unit 220 and may have components for applying power to the heat radiating unit 220.

Figure 3:
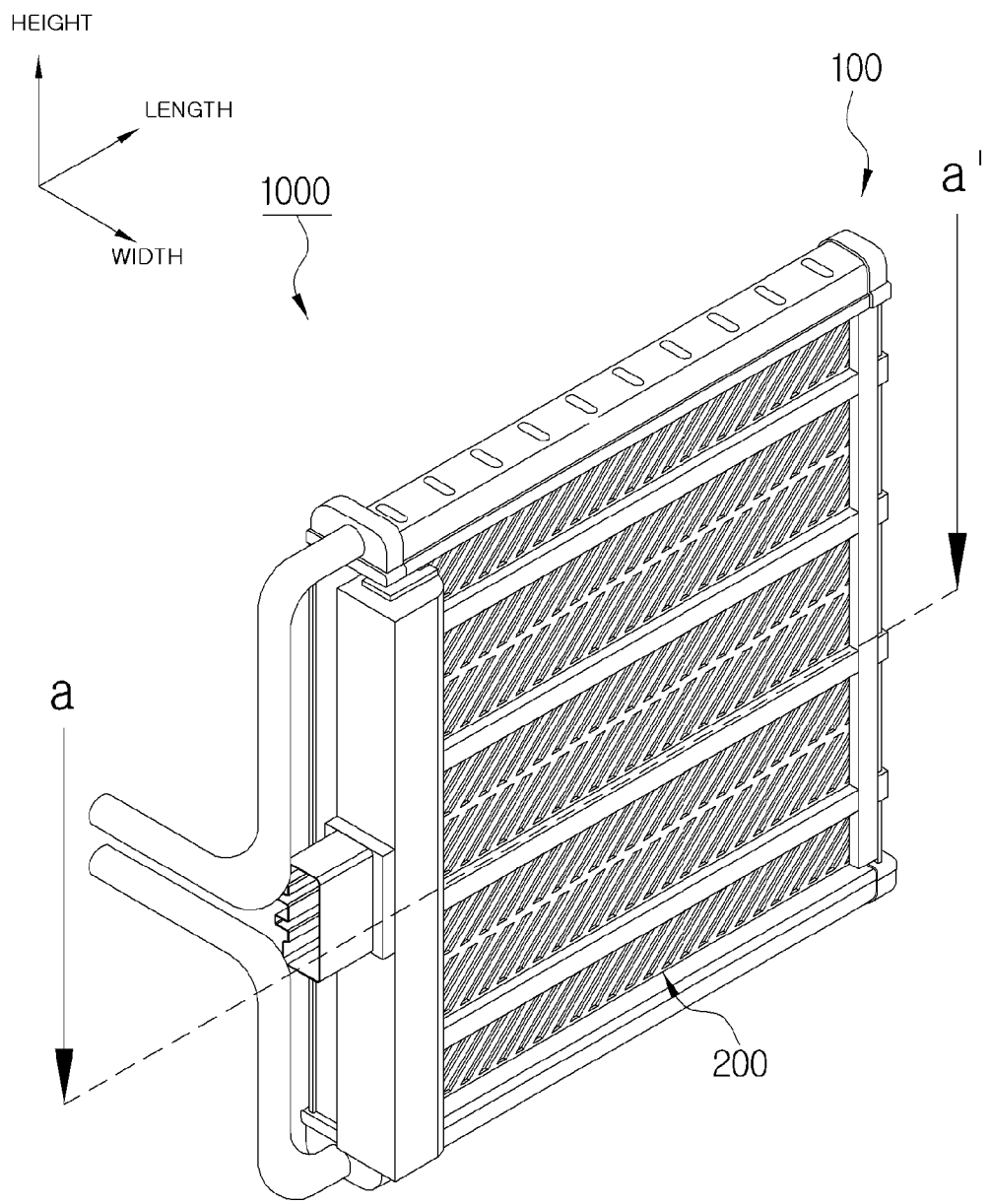
FIGS. 3 and 4 are respectively a perspective view and an exploded perspective view of a heater for vehicles according to an exemplary embodiment of the present invention.

In the heater 1000 for vehicles according to the exemplary embodiment of the present invention, the second heater 200 uses the plate-shaped first support part 210 having a simple shape to more simplify the configuration as compared with the configuration of using the existing fin shape, and the heat radiating unit 220 is formed in the first heat radiating region A210-1 to reduce the entire thickness (i.e., a forming length of a second heater 200 in a width direction of FIG. 3), thereby implementing the miniaturization.

In the heater 1000 for vehicles according to the exemplary embodiment of the present invention, the first heater 100 and the second heater 200 are assembled by various methods.

First, the housing 240 is provided with a first fixed part 241 which is fastened with the first protrusion 152 on one side of the first side plate 150, and on an opposite side of the first support part 210, the first side plate 150 can be fixed to the second side plate 160 by a second fixed part 250.

That is, the housing 240 is provided with the first fixed part 241 located adjacent to one end of the first side plate 150, and the first side plate 150 has the second fixed part 250 located at another end thereof, which are each fixed to the first protrusion 152 of the first side plate 150 and the second protrusion 162 of the second side plate 160, such that the second heater 200 may be assembled with the first heater 100.

In this case, the heater 1000 for vehicles according to the exemplary embodiment of the present invention, the first fixed part 241 and the second fixed part 250 may have various structures, and the detailed exemplary embodiments thereof will be described below.

In this case, in the second heater 200, as the first support part 210 is formed at a size corresponding to the tube 130 and fin 140 forming a region of the first heater 100, both sides in a longitudinal direction of FIG. 3 are each fixed by the first fixed part 241 and the second fixed part 250 and both sides in a height direction may be each supported by a first header tank 111 and a second header tank 112 of the first heater 100.

That is, even though the heater 1000 for vehicles according to the exemplary embodiment of the present invention is provided in an air conditioning case 300 in any direction, the second heater 200 is stably fixed to the first heater 100 in all the directions represented in the longitudinal direction and the height direction in FIG. 3.

Further, the first heater 100 and the second heater 200 are adhered to each other in a width direction, such that air passing through the first heater 100 does not pass through the second heater 200 and is not leaked and the whole quantity of air passes through the second heater 200, thereby expecting the sufficient heating performance.

First, the shape of the first fixed part 241 and the second fixed part 250 illustrated in FIGS. 4 and 5 is described.

The first fixed part 241 may have a structure in which the first fixed part 241 is inserted with the first protrusion 152 on one side of the first side plate 150 to fix the first protrusion 152.

Further, the heater 1000 for vehicles according to the exemplary embodiment of the present invention may be configured to include a fixed body 251 in which the second fixed part 250 is integrated with the first support part 210 and a first fixed hook 252 extending from the fixed body 251 to increase the fixing force of the first heater 100 and the second heater 200 and facilitate the fastening process.

That is, the first fixed part 241 can be a groove into which the first protrusion 152 of the first side plate 150 is inserted and is configured to support the first protrusion 152.

Further, in the second heater 200, the second fixed part 250 provided with the first fixed hook 252 of the opposite side provided with the housing 240 in a longitudinal direction fixes the second protrusion 162 of the second side plate 160 to complete the fastening.

The first fixed hook 252 has a structure that easily moves in the fastening direction of the second heater 200 and is difficult to perform unfastening in an opposite direction and may be formed as illustrated in FIG. 5.

As illustrated in FIG. 4, the second fixed part 250 may be integrally formed in a height direction with the fixed body 251 and the first fixed hook 252. In this case, the forming length of the heat radiating unit 200 may be controlled corresponding to the region in which the second fixed part 250 is formed.

Further, in the heater 1000 for vehicles according to the exemplary embodiment of the present invention, the second fixed part 250 is disposed only in the first air flow region A210-2 of the first support part 210 and may also be formed in plural corresponding to the number which may provide the required fixing force.

Further, the first fixed part 241 may be preferably provided with an inclined part 242 of which the predetermined region of an end at an opposite side of a surface contacting the first protrusion 152 has a smooth inclination to reduce a thickness of a material, so as to facilitate the entire movement at the time of the fastening process of the second heater 200 (see FIG. 5).

In more detail, the end of the first fixed part 241 provided with the inclined part 242 is disposed at a corner region of the first plate part 151 and the first protrusion 152 of the first side plate 150 even in the state in which the second heater 200 is inclined, thereby more easily performing the fastening of the second heater 200.

Figure 6:
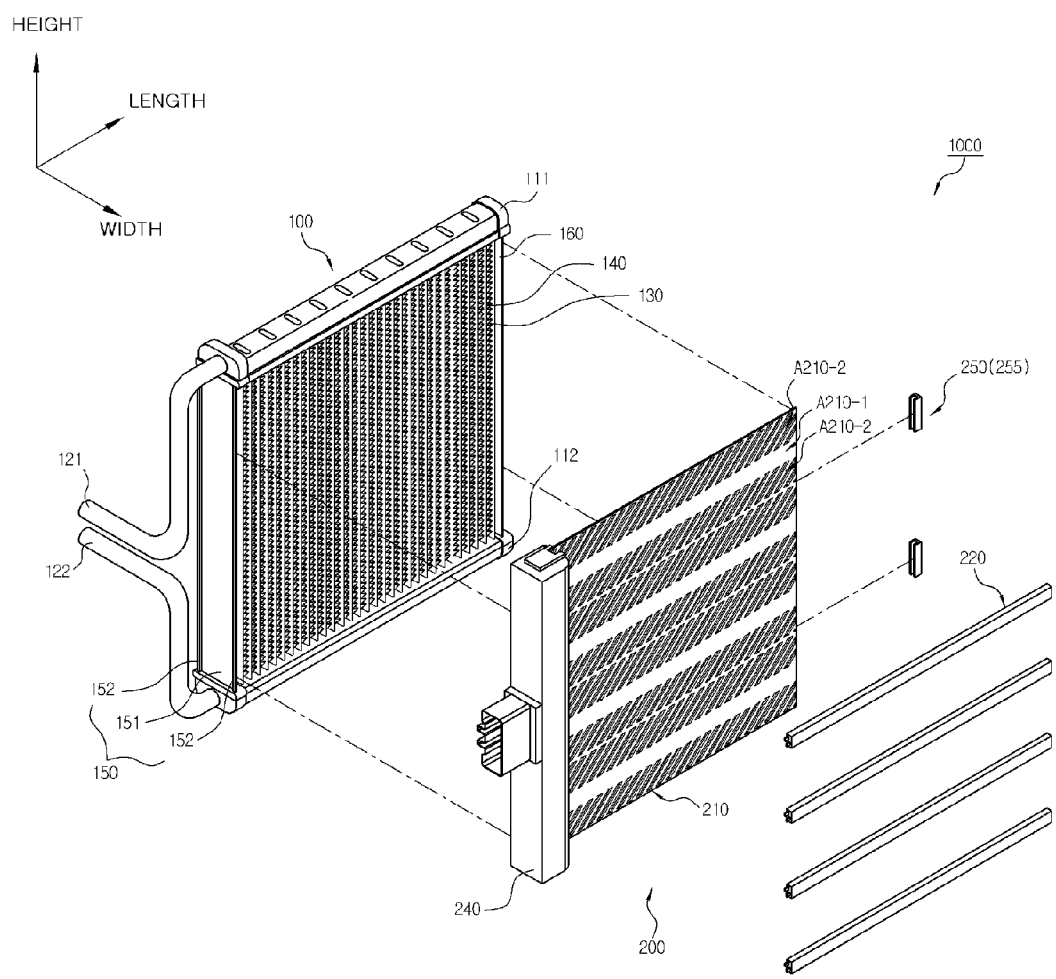
FIGS. 6 and 7 are respectively an exploded perspective view and a cross-sectional view of a heater for vehicles according to another exemplary embodiment of the present invention.
Figure 7:
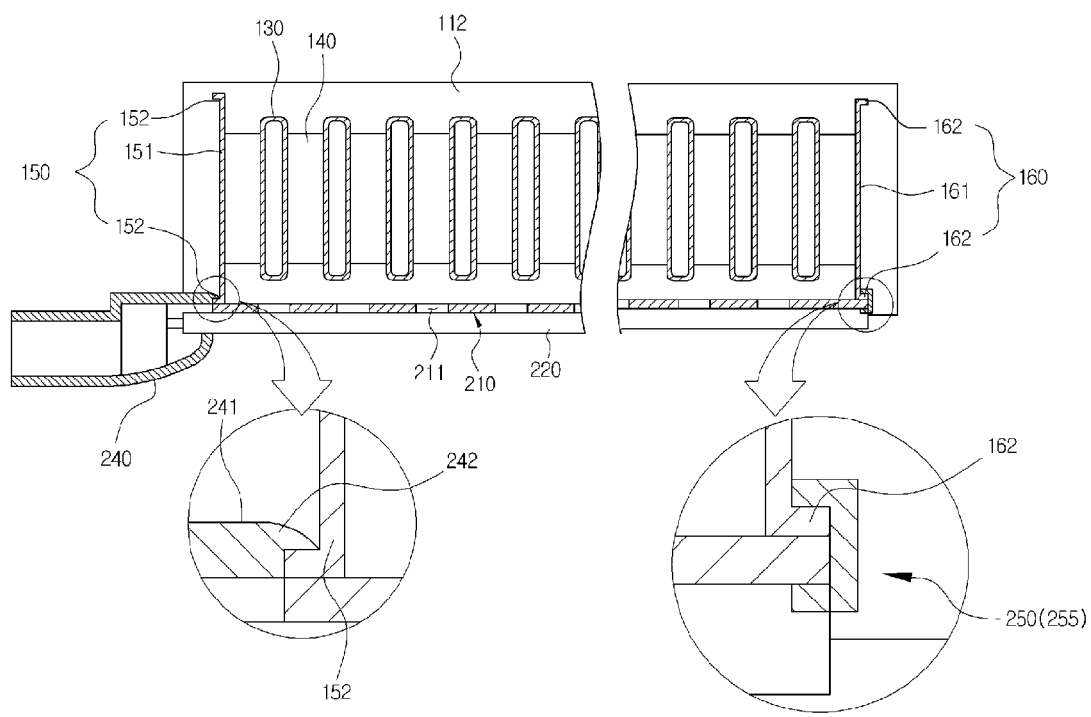

The structure of the first fixed part 241 illustrated in FIGS. 6 and 7 is similar as the structure illustrated in FIGS. 4 and 5 but illustrates an example in which, as the second fixed part 250 simultaneously fixing the first support part 210 and the second protrusion 162 of the second side plate 160, a separate fixed clip 255 is used.

In this case, the fixed clip 255 preferably fixes the second protrusion 162 of the second side plate 160 and the first support part 210 in the region in which the heat radiating unit 220 is not provided in a height direction, so as to increase the fixing force.

FIG. 6 illustrates an example in which the fixed clip 255 is disposed at two places in a height direction, but the heater 1000 for vehicles according to the exemplary embodiment of the present invention is not limited thereto and the fixed clip 255 applies an elastic force inwardly, such that more various members capable of fixing the first support part 210 and the second protrusion 162 on one side of the second side plate 160 may be freely used in one or two or more.

Figure 8:
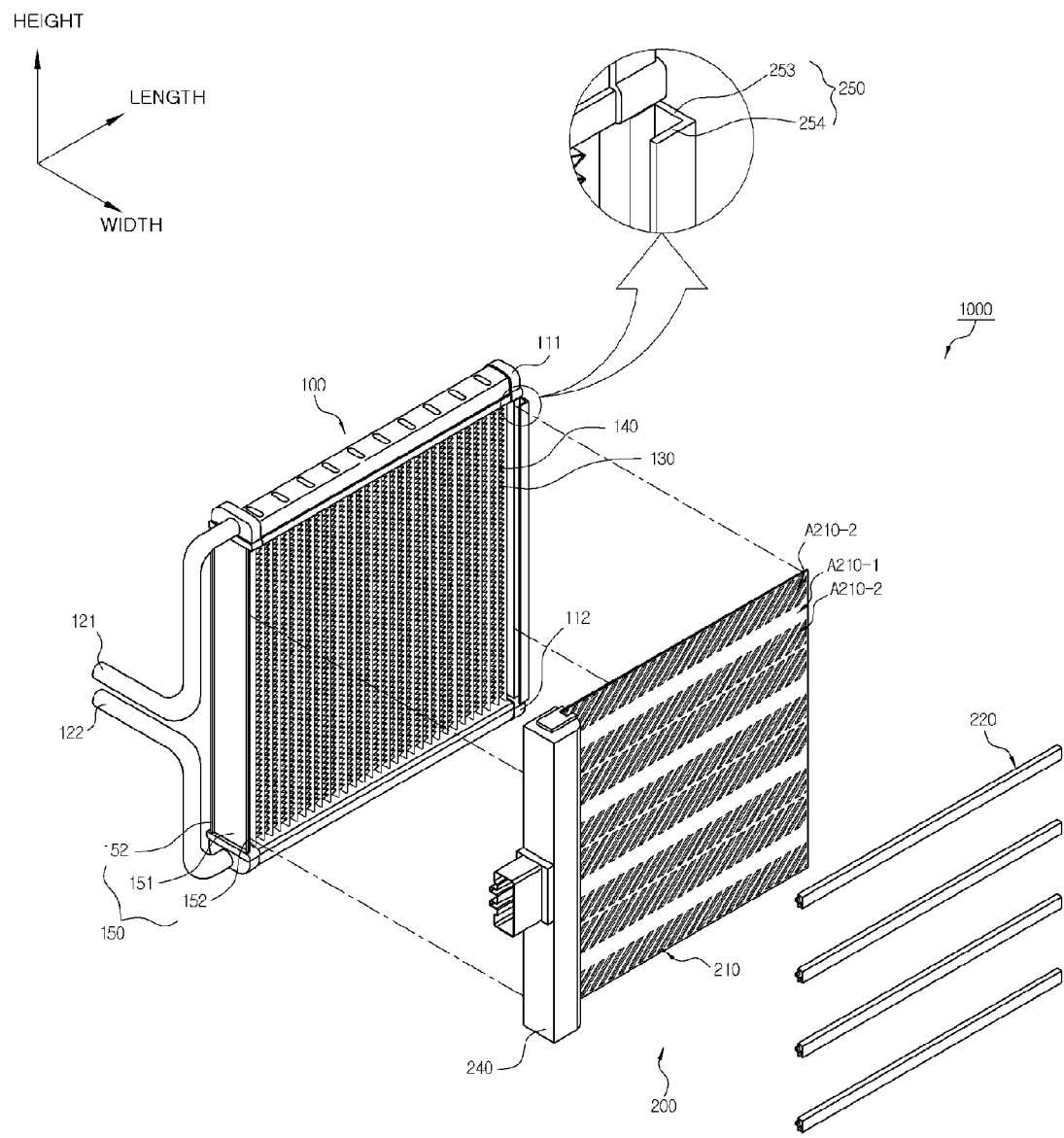
FIGS. 8 to 10 are respectively an exploded perspective view of the heater for vehicles according to the exemplary embodiment of the present invention and a cross-sectional view of a state after and before being fastened.
Figure 9:
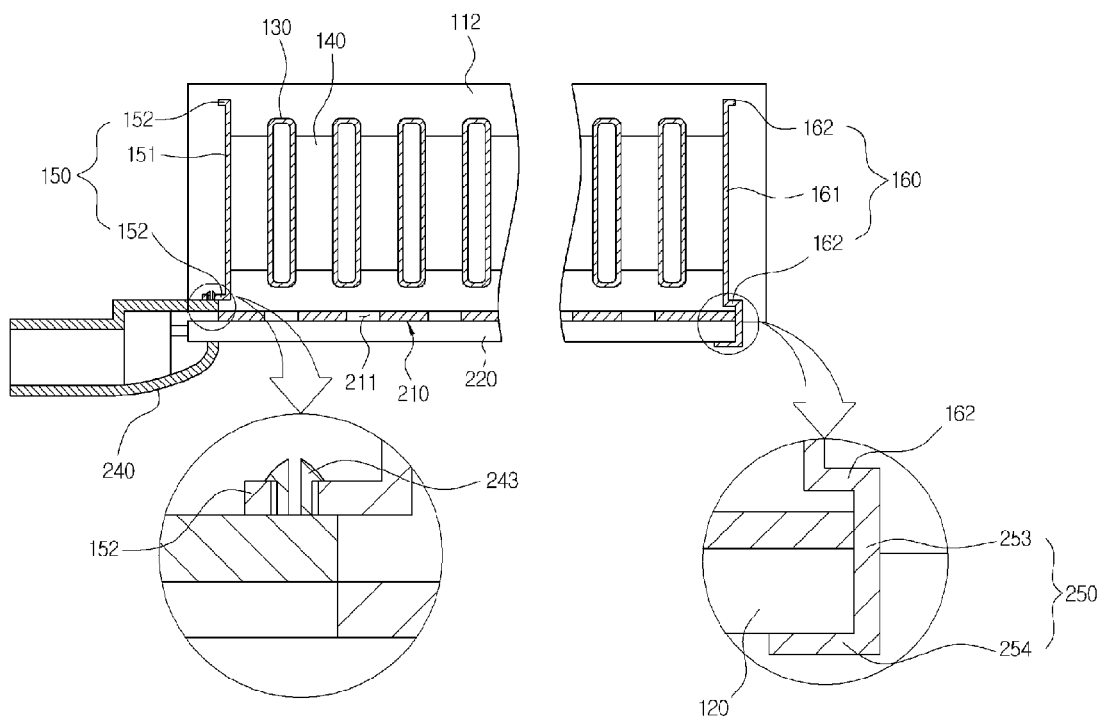
Figure 10:
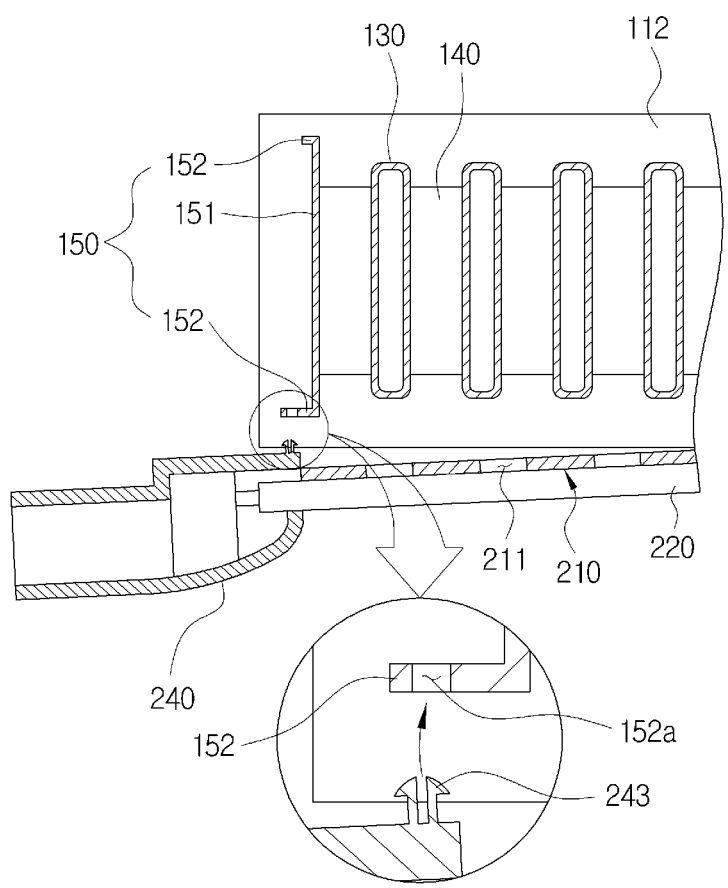

The structure illustrated in FIGS. 8 to 10 illustrates an example in which the first fixed part 241 uses a second fixed hook 243 and the second side plate 160 extends so as to insert one end (right portion in the drawings) of the second heater 200 into the second fixed part 250.

In this case, FIG. 10 illustrates the state before the second heater 200 is fixed to the first heater 100 and FIG. 9 illustrates the state in which the second heater 200 is fixed to the first heater 100.

In more detail, the second fixed part 250 may be formed to extend from the second side plate 160.

FIG. 9 illustrates an example in which the second side plate 160 is formed to include the second plate part 161 and the second protrusions 162 protruding at both sides of the second plate part 161 and an end of one of the second protrusions 162 is attached to a first bent part 253 which extends to be bent in the air flow direction and a second bent part 254 which is bent from an end of the first bent part 253 to be formed in parallel with the second protrusion 162 and to have a groove formed therein.

Further, in the heater 1000 for vehicles according to the exemplary embodiment of the present invention, the second side plate 160 is provided with the second plate part 161, where one side of the second plate part 161 is provided with the second protrusion 162, and the second fixed part 250 may be formed to extend from the second plate part 161.

The first fixed part 241 is the second fixed hook integrally formed in the housing 240 and the first protrusion 152 of the first side plate 150 is preferably provided with a hollow or perforated hole 152a into which the second fixed hook 243 is inserted so as to increase the fixing force of the first heater 100 and the second heater 200.

The one end of the second heater 200 which is the right portion of the drawing is supported by the second fixed part 250 and the left portion of the drawing is fixed by the first fixed part 241, such that the second heater 200 and the first heater 100 are assembled.

Figure 11:
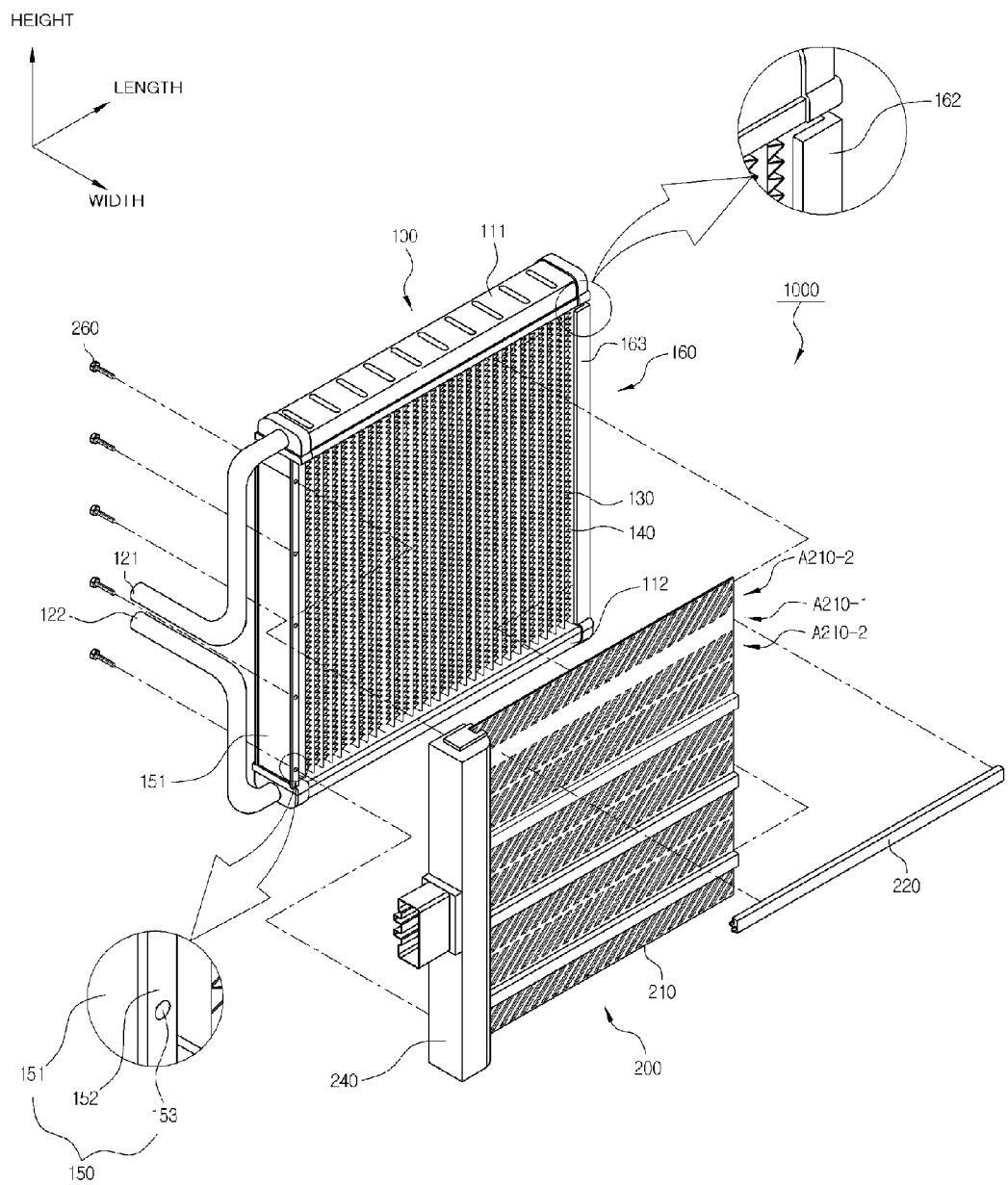
FIGS. 11 and 12 are respectively an exploded perspective view and a cross-sectional view of a heater for vehicles according to another exemplary embodiment of the present invention.
Figure 12:
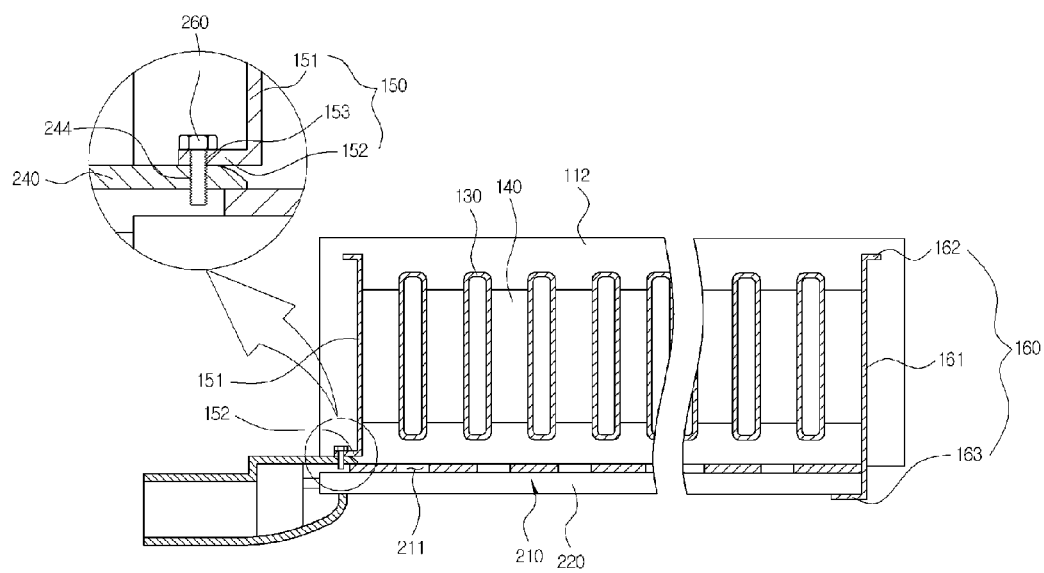

FIGS. 11 and 12 are respectively an exploded perspective view and a cross-sectional view of the heater 1000 for vehicles according to another exemplary embodiment of the present invention and illustrate an example in which the first heater 100 and the second heater 200 are assembled using a fastener 260.

In the example illustrated in FIGS. 11 and 12, the first protrusion 152 on one side of the first side plate 150 is provided with a first fastening part 153.

The first protrusion 152 on one side of the first side plate 150 is a portion which provides a coupled surface with the second heater 200 by bending one side of the first plate part 151.

The first fastening part 153 is a portion at which a predetermined region of the first protrusion 152 is hollowed or perforated and is a region in which the fastener 260 is fastened.

The size of the first protrusion 152 is set enough to be provided with the first fastening part 153 and the first protrusion 152 is formed to have durability enough to maintain the fastening with the fastener 260.

Further, in the example illustrated in FIGS. 11 and 12, the housing 240 has a predetermined region hollowed or perforated to correspond to the first fastener 153 and the housing 240 is provided with the second fastening part 244.

That is, the housing 240 is formed to contact the first protrusion 152 of the first side plate 150 to be fixed to the first heater 100 and is provided with the second fastening part 244 corresponding to the first fastening part 153.

The fastener 260 is fastened with the first fastener 153 and the second fastener 244 to fix the first heater 100 and the second heater 200.

In this case, in the heater 1000 for vehicles, the second fastening part 244 is hollowed or perforated at a size corresponding to the hollowed or perforated region of the first fastening part 153 and is formed in a form depressed to a predetermined depth and an inner circumferential surface thereof is provided with a screw thread and the fastener 260 may be a bolt corresponding to the screw thread.

The fastener 260 is a portion fixing the first protrusion 152 of the first side plate 150 and the housing 240 and may be fastened with the second fastening part 244 by penetrating through the first fastening part 153.

The heater 1000 for vehicles according to the exemplary embodiment of the present invention uses the fastener 260 in a bolt form to firmly assemble the first heater 100 and the second heater 200.

FIG. 11 illustrates an example in which five fasteners 260 are disposed in a height direction, but the heater 1000 for vehicles according to the exemplary embodiment of the present invention is not limited thereto and the number and shape of fasteners 260 may be more variously formed.

Further, in the heater 1000 for vehicles according to the exemplary embodiment of the present invention, the second plate part 161 of the second side plate 160 may be provided with an extension 163 so that the first heater 100 supports an opposite side of the second heater 200.

The extension 163 may be formed in a structure in which one side of the second plate part 161 of the second side plate 160 extends by the thickness of the second heater 200 in a front side direction, i.e., in a width direction as shown in the drawing, and an end of the extension 163 is bent to enclose the end of the second heater 200.

In this case, the bent direction, which is a center in which air flows, is a direction facing a central portion of the second heater 200 in a longitudinal direction.

Referring to FIG. 12, the extension 163 is a portion extending from the second plate part 161 of the second side plate 160 to form a predetermined space enclosing an opposite side at which the housing 240 of the second heater 200 is disposed and the space is formed enough to receive a width of the second heater 200.

Further, the heater 1000 for vehicles according to the exemplary embodiment of the present invention may further include a second heat radiating region S230-1 which corresponds to the first heat radiating region A210-1 of the first support part 210 and a second support part 230 which is provided with a plurality of second hollow parts 231 adjacent to the second heat radiating region A230-1 and perforated in a predetermined region thereof and includes the second air flow region A230-2 corresponding to the first air flow region A210-2 of the first support part 210 (see FIGS. 15 to 19), in order for the second heater 200 to support both surfaces of the heat radiating unit 220 together with the first support part 210.

The second support part 230 is formed in the same plate form as the first support part 210 and is configured to include the second heat radiating region A230-1 and the second air flow region A230-2.

Figure 15:
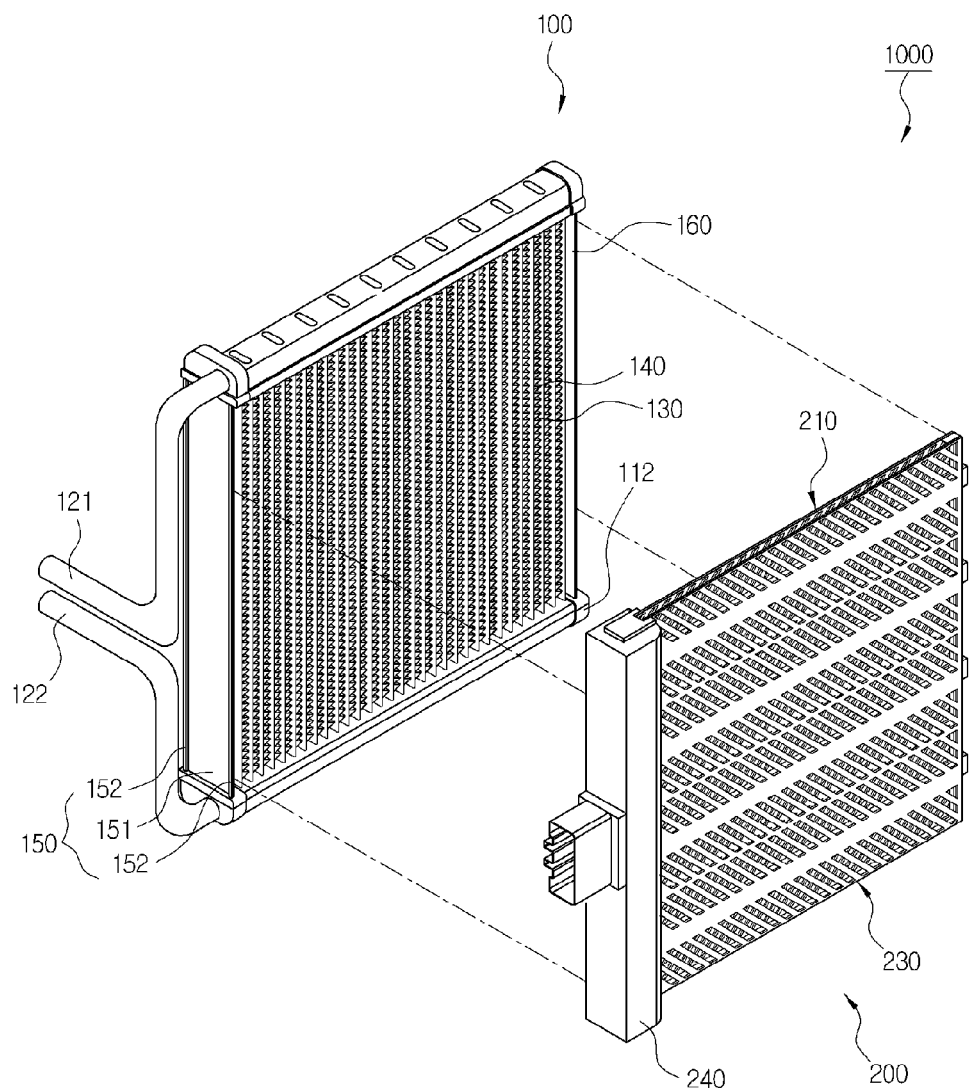
FIGS. 15 and 16 are respectively a perspective view and a cross-sectional view of a heater for vehicles according to another exemplary embodiment of the present invention.
Figure 16:
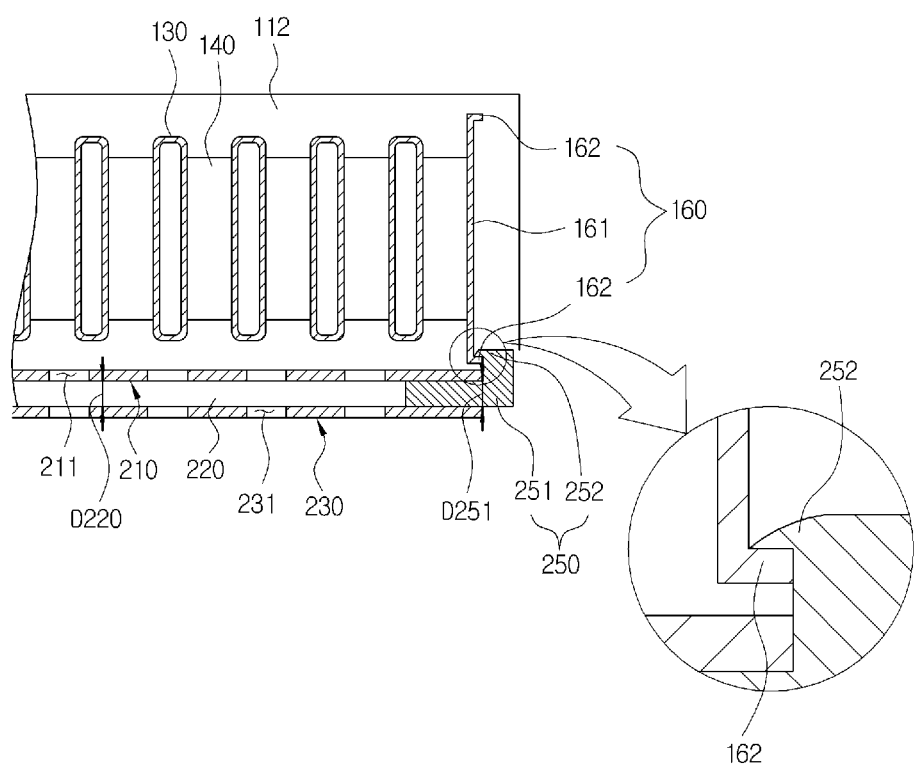
Figure 17:
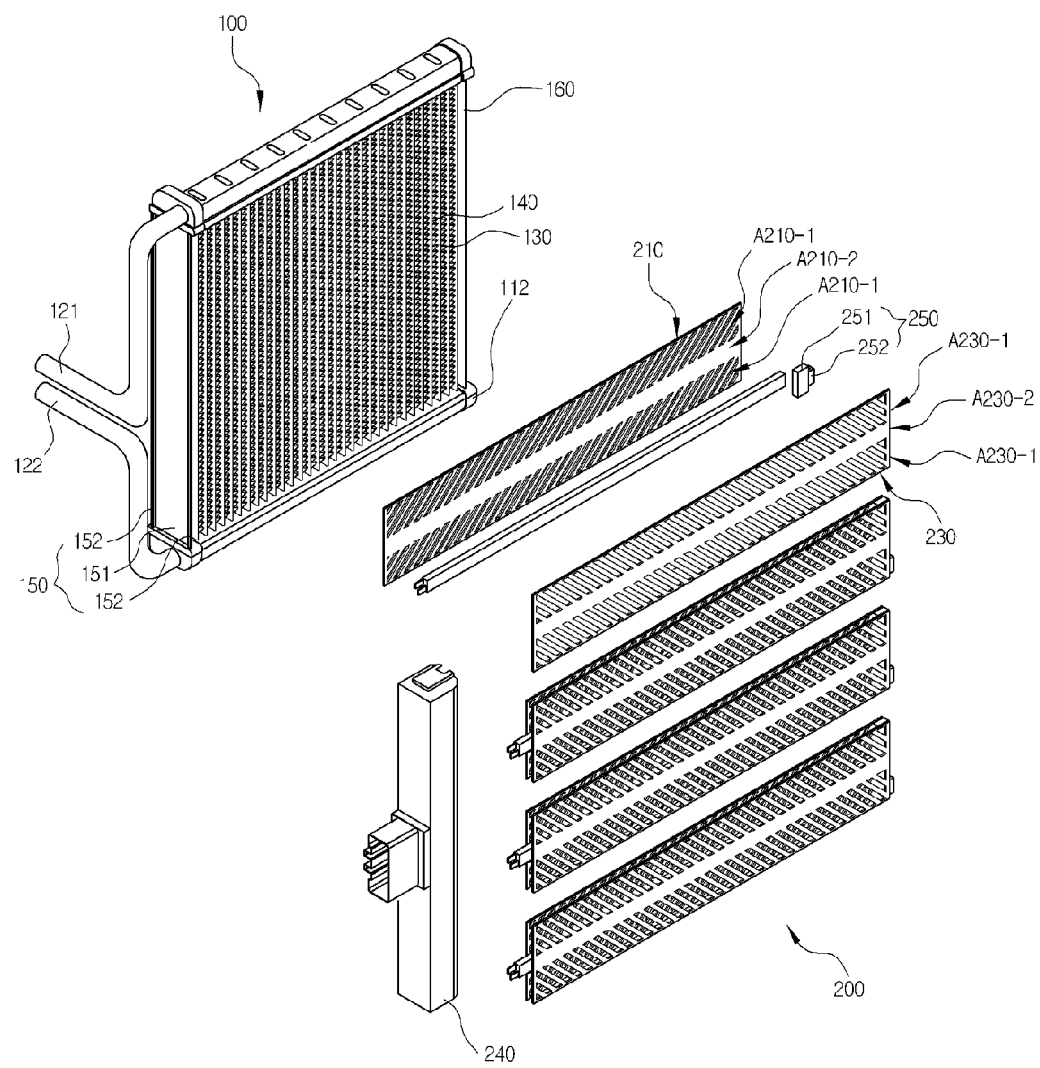
FIG. 17 is a perspective view illustrating a heater for vehicles according to another exemplary embodiment of the present invention.
Figure 18:
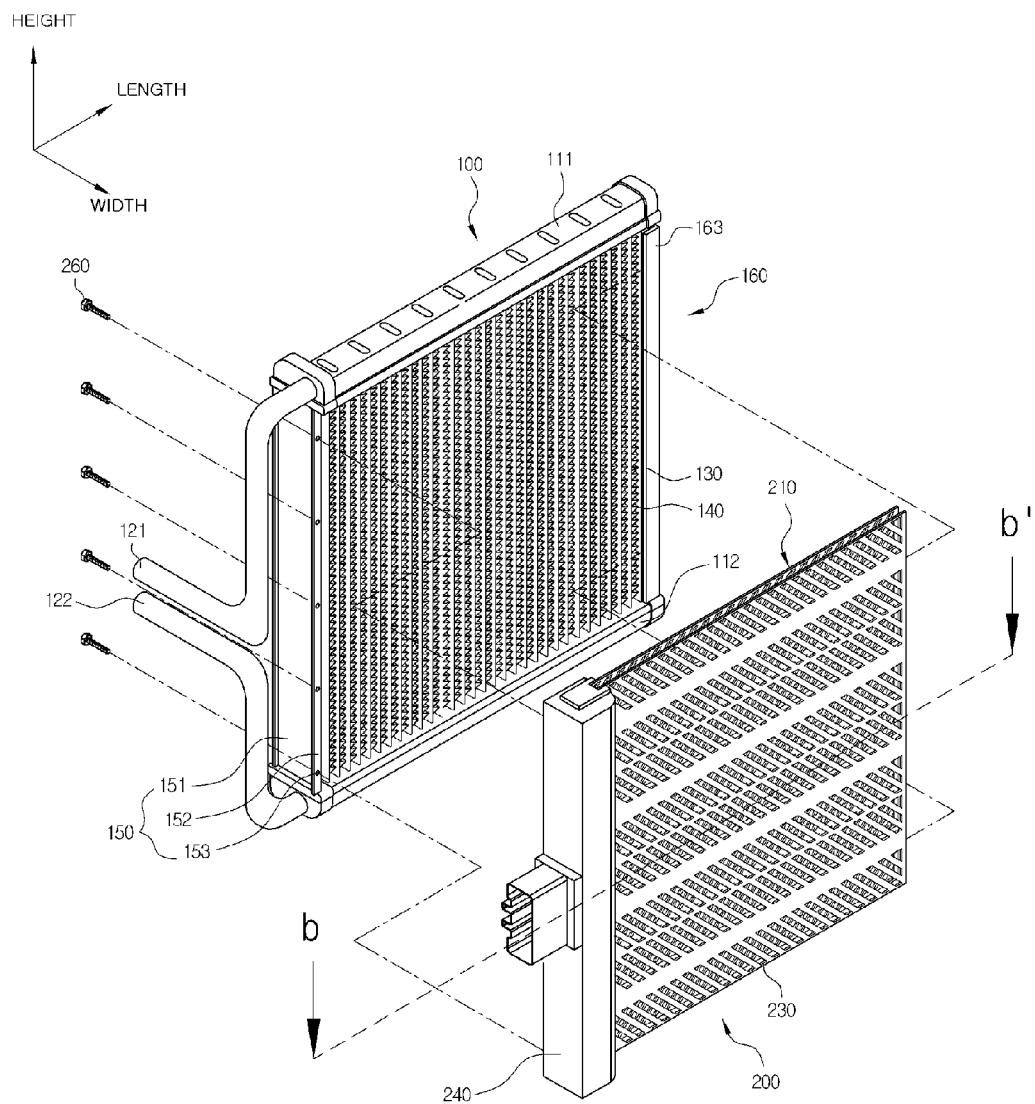
FIGS. 18 and 19 are respectively an exploded perspective view and a cross-sectional view of a heater for vehicles according to another exemplary embodiment of the present invention.
Figure 19:
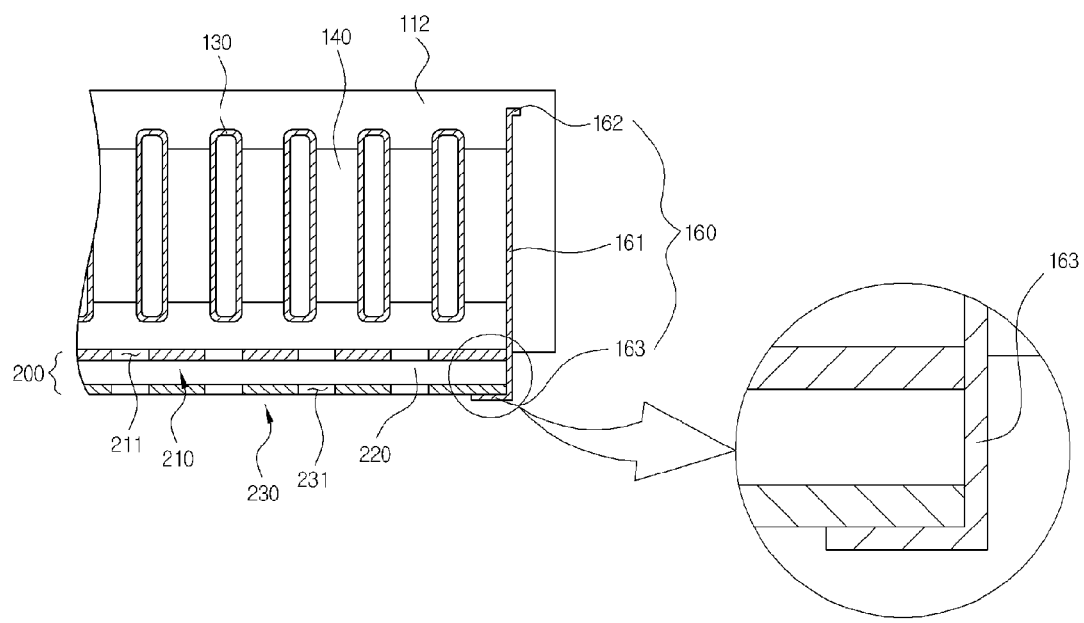

FIGS. 15 to 17 illustrate an example in which the first heater 100 and the second heater 200 are fixed by the first fixed part 241 and the second fixed part 250 and FIGS. 18 and 19 illustrate an example in which the first heater 100 and the second heater 200 are fixed using the fastener 260 and the extension 163.

First, FIGS. 15 to 17 illustrate an example in which the first hollow part 211 of the first support part 210 and the second hollow part 231 of the second support part 230 are each formed to be inclined by a predetermined angle but the inclined angles thereof are different from each other and an example in which they corresponds to overlap each other in only the predetermined region in a region of the first hollow part 211 and the second hollow part 231 in an air flow direction (width direction illustrated in the drawings).

In more detail, in the form illustrated in FIGS. 15 to 17, a part of air passing through the first hollow part 211 of the first support part 210 is directly discharged through the second hollow part 231 of the second support part 230 and the rest thereof is formed as a turbulence flow by colliding with a plate region of the second support part 230 and then is discharged.

Further, in this case, the fixed body 251 of the second fixed part 250 is formed to have the same thickness D251 as the thickness D220 of the heat radiating part 220 integrally formed with the first support part 210 and the second support part 230, thereby more reinforcing the durability (see FIG. 16).

Meanwhile, FIGS. 15 and 16 illustrate an example in which the first support part 210 is formed in a single board and also the second support part 230 is formed in a single board, and FIG. 17 illustrates an example in which the first support part 210 is formed in a plurality of module types in a height direction and illustrates an example in which the second support part 230 corresponding thereto is also formed in a size corresponding to the first support part 210 and thus the first and second support parts form a module together.

That is, in the structure in which the second support part 230 is further provided to facilitate the assembly, the second support part 230 is preferably formed to correspond to the forming region (size) of the first support part 210.

FIGS. 18 and 19 illustrate that the fixed type of the first heater 100 and the second heater 200 is similar to the type illustrated in FIGS. 11 and 12 but illustrate a type in which the second heater 200 includes the second support part 230.

Therefore, the extension 163 of the second side plate 160 should be formed to receive the entire width of the second heater 200 which includes the first support part 210, the heat radiating unit 220, and the second support part 230.

Figure 22:
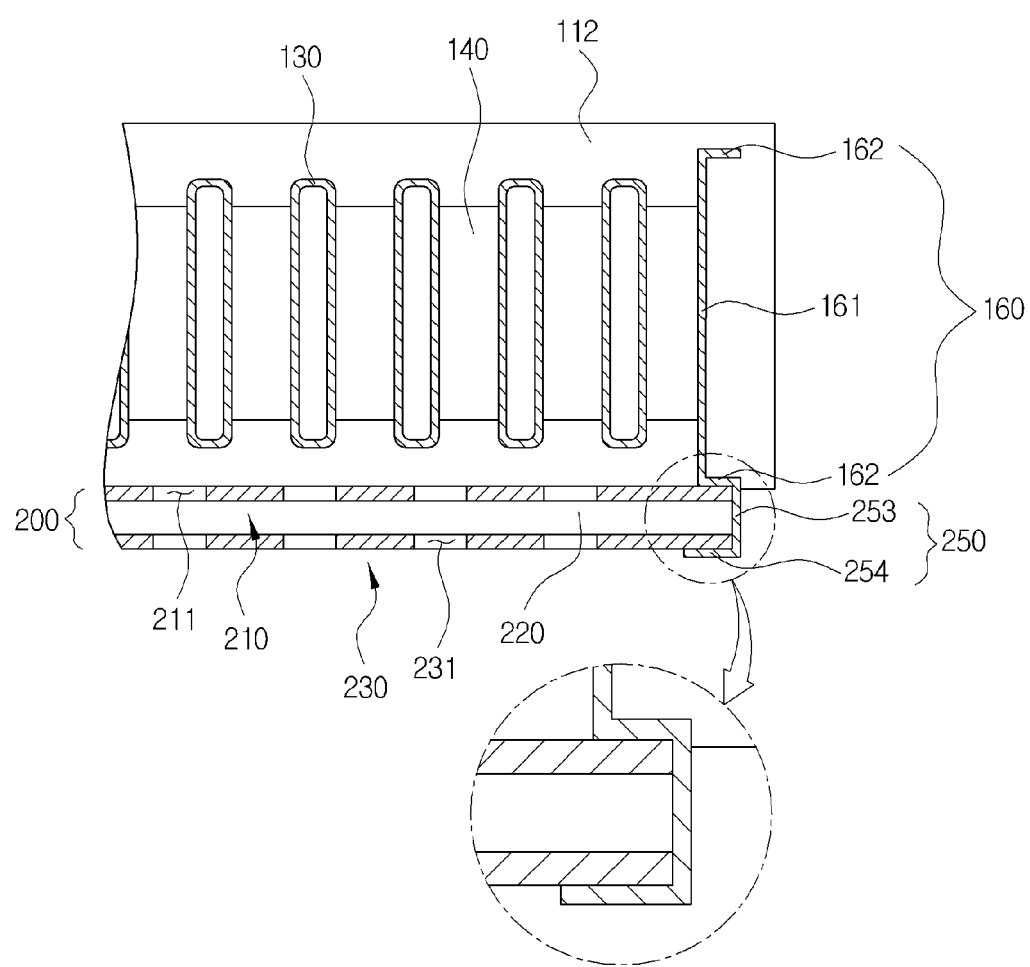
FIGS. 22 and 23 are a cross-sectional view of a heater for vehicles according to another exemplary embodiment of the present invention.

Further, FIG. 22 illustrates that the fixed type of the first heater and the second heater is similar to the type illustrated in FIGS. 8 and 9, but illustrates a type in which the second heater 200 includes the second support part 230.

Therefore, the second side plate 160 is formed to include the second plate part 161 and the second protrusions 162 protruding at both sides of the second plate part 161 and an end of the second protrusion 162 may be formed to include a first bent part 253 which extends to be bent in the air flow direction and a second bent part 254 which is bent from an end of the first bent part 253 to be formed in parallel with the second protrusion 162 and to have a groove formed therein.

In this case, the first bent part 253 should be formed to receive the entire width of the second heater 200 which includes the first support part 210, the heat radiating unit 220, and the second support part 230.

Figure 23:
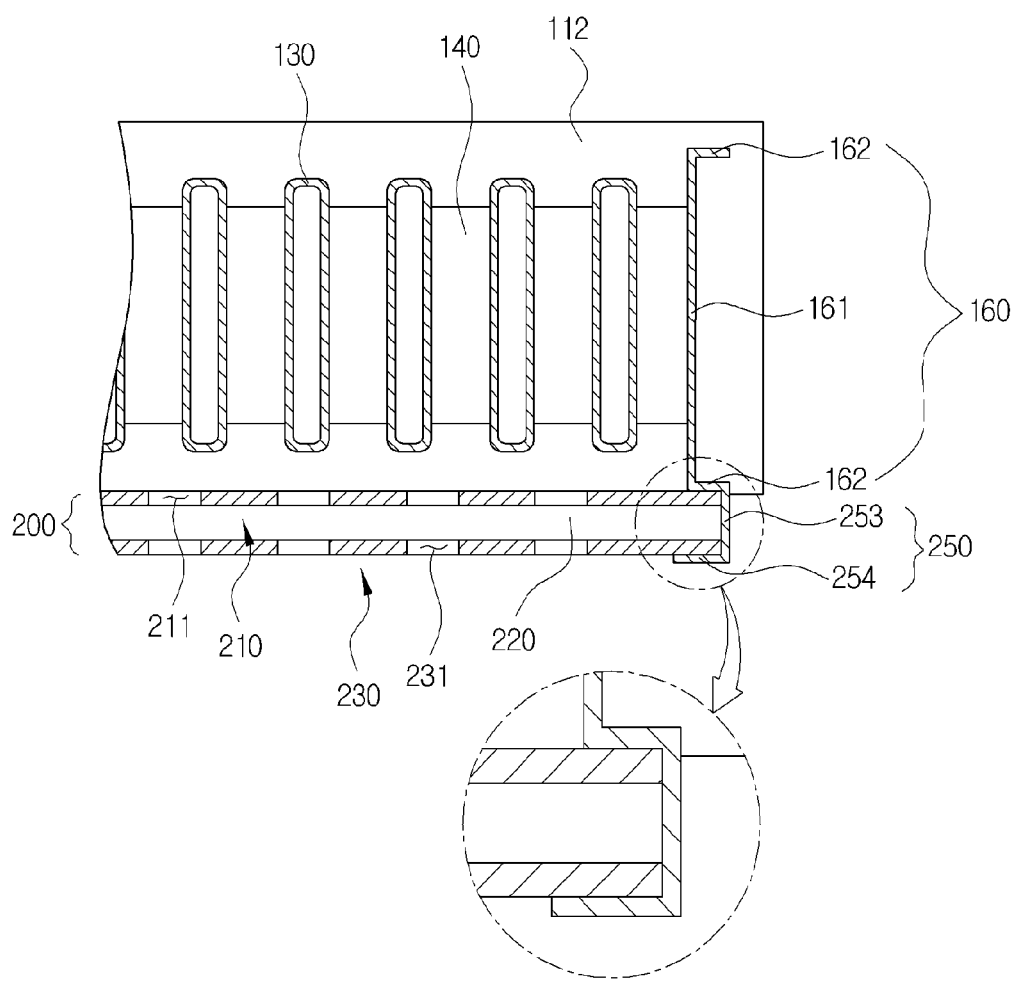

As another exemplary embodiment of the present invention, as illustrated in FIG. 23, the heater 1000 for vehicles according to the exemplary embodiment of the present invention may be configured to include the second fixed part 250 which is fixed to the second protrusion 162 protruding to one side of the second plate part 161 of the second side plate 160 by extending the end of the second support part 230 of an opposite side provided with the housing 240 to the second side plate 160 side.

In this case, a length formed by extending the end of the second support part 230 to the second side plate 160 side should be formed to receive the entire width of the heat radiating unit 220, the first support part 210, and the second protrusion 162.

Figure 20:
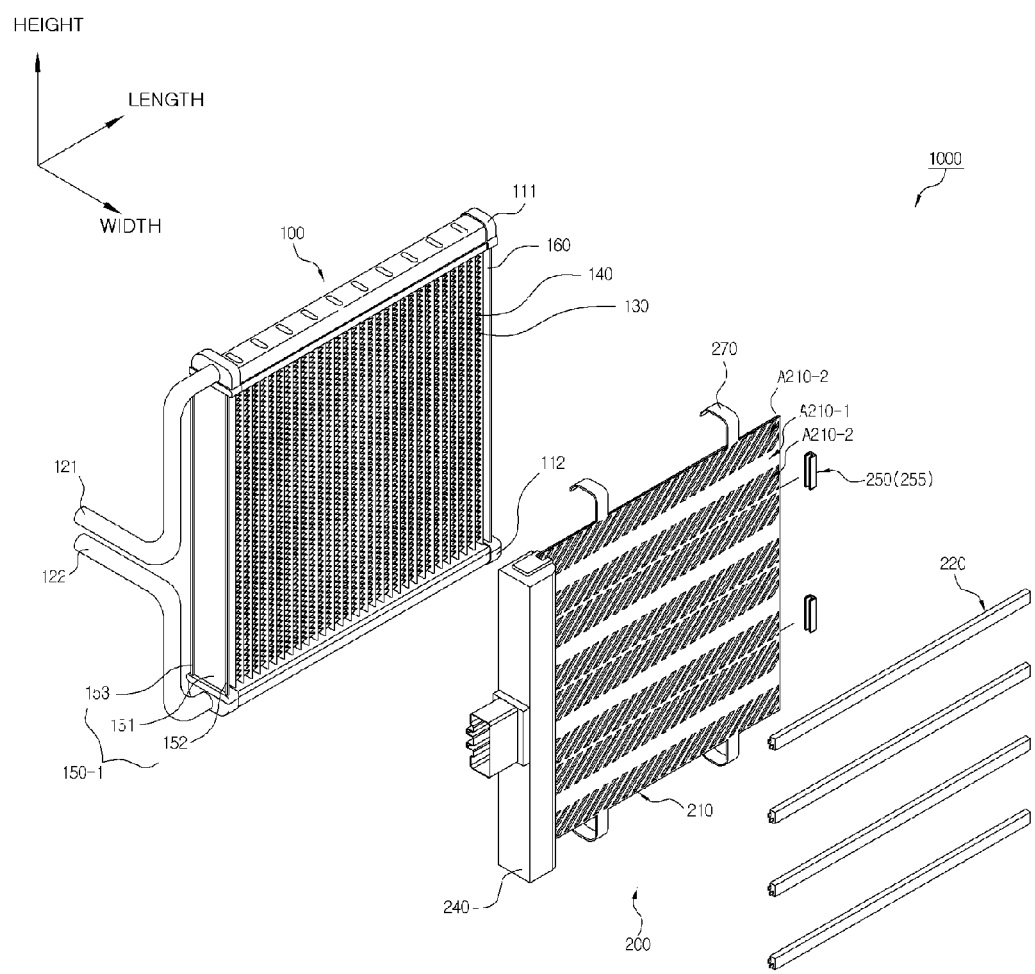
FIGS. 20 and 21 are perspective, exploded views of a heater for vehicles according to two different exemplary embodiments of the present invention.

Meanwhile, as illustrated in FIG. 20, the second heater 200 is integrally formed at the upper and lower ends in a height direction and may be configured to include a third fixed hook 270 which is hung on the outer circumferential surface of the first header tank 111 or the second header tank 112 of the first heater 100.

In this case, the second heater 200 may also limit the movement in the height direction by the third fixed hook 271 in the state in which it is fixed in a longitudinal direction by various exemplary embodiments of the first fixed part 241 and the second fixed part 250 as described above and the first heater 100 and the second heater 200 may be coupled with each other only by the third fixed hook 271.

Figure 21:
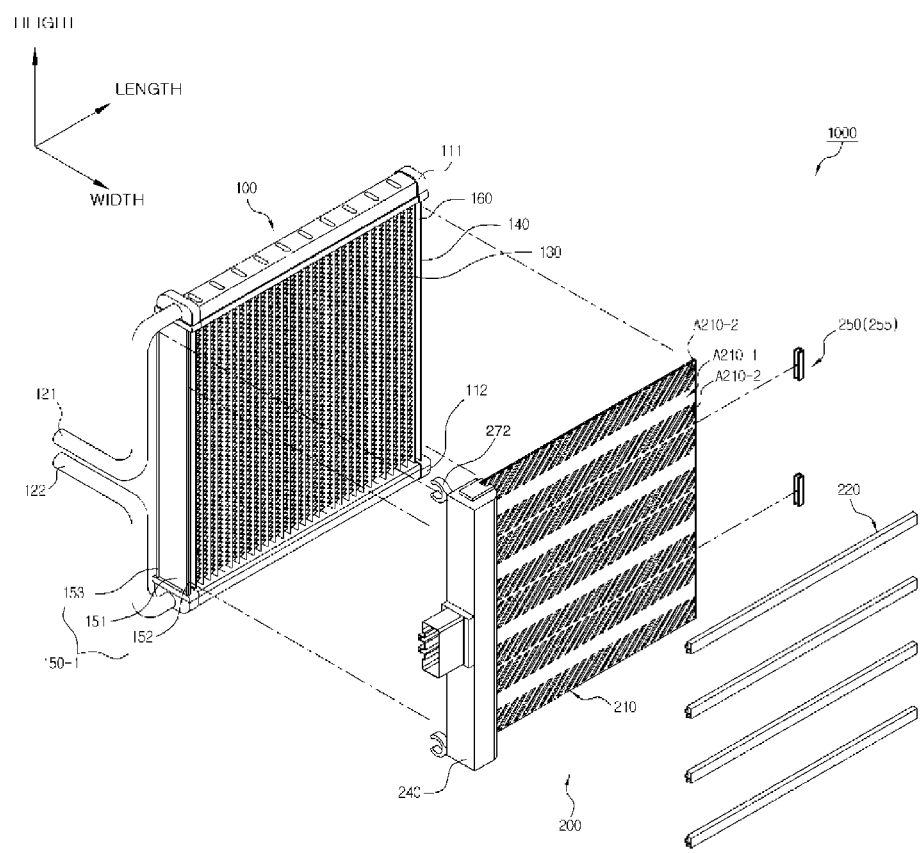

Further, as illustrated in FIG. 21, the second heater 200 is formed on the side of the first heater 100 of the housing 240 and may further include a fourth fixed hook 272 which encloses the inlet pipe 121 or the outlet pipe 122 of the first heater 100 and is fixed to the housing 240.

Figure 24:
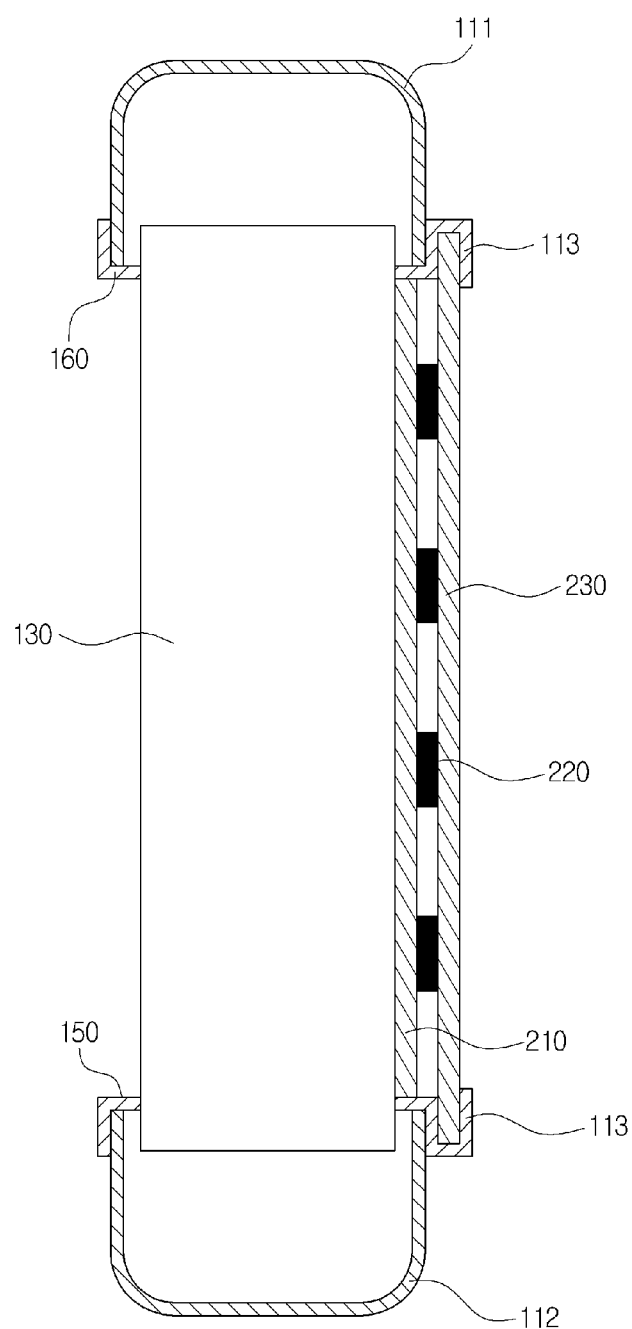
FIG. 24 is a side view of a heater for vehicles according to another exemplary embodiment of the present invention.

As another exemplary embodiment of the present invention, as illustrated in FIG. 24, the heater 1000 for vehicles includes a heater extension 113 which is formed by extending the header of the first header tank 111 or the second header tank 112 to the second heater 200 side and the header extension 113 may support and fix both ends of the second heater 200 in a height direction.

The header extension 113 is formed by bending the end of the second heater 200 side of the header and may be formed to insert both ends of the second support part 230 into the bent region.

In this case, the second heater 200 may be coupled with the first heater 100 by mounting the first support part 210 in a space between the header of the first header tank 111 and the header of the second header tank 112 and inserting both ends of the second support part 230 into the bent region of the header extension 113.

Figure 25:
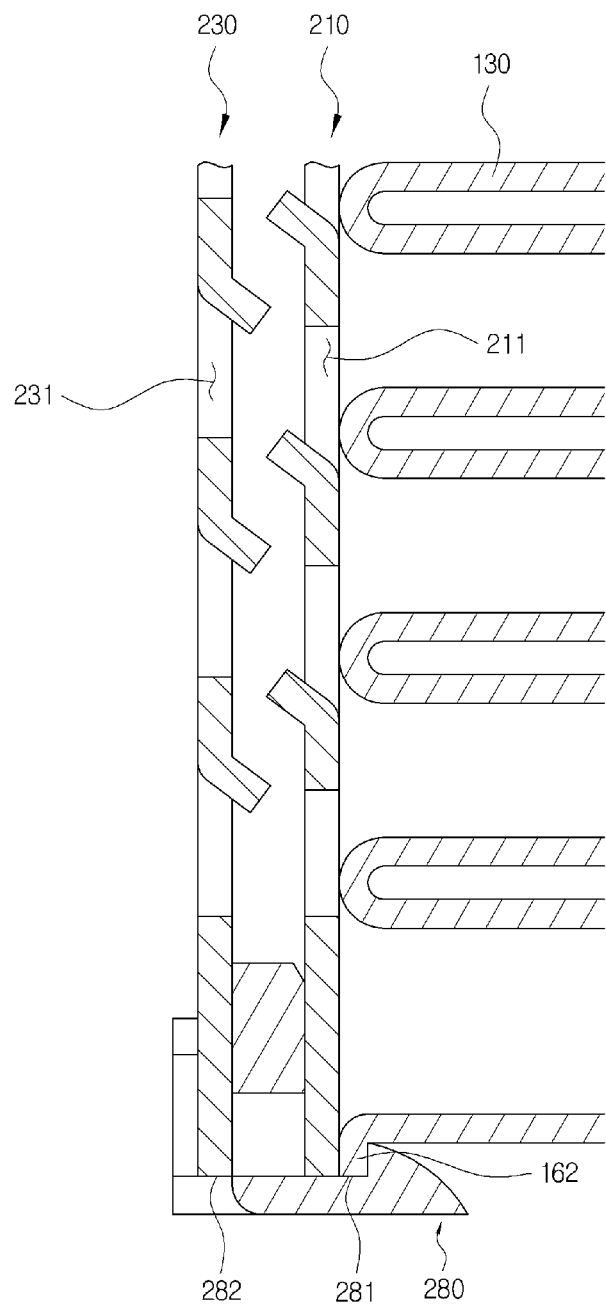
FIG. 25 is a side cross-sectional view of a heater for vehicles according to another exemplary embodiment of the present invention.
Figure 26:
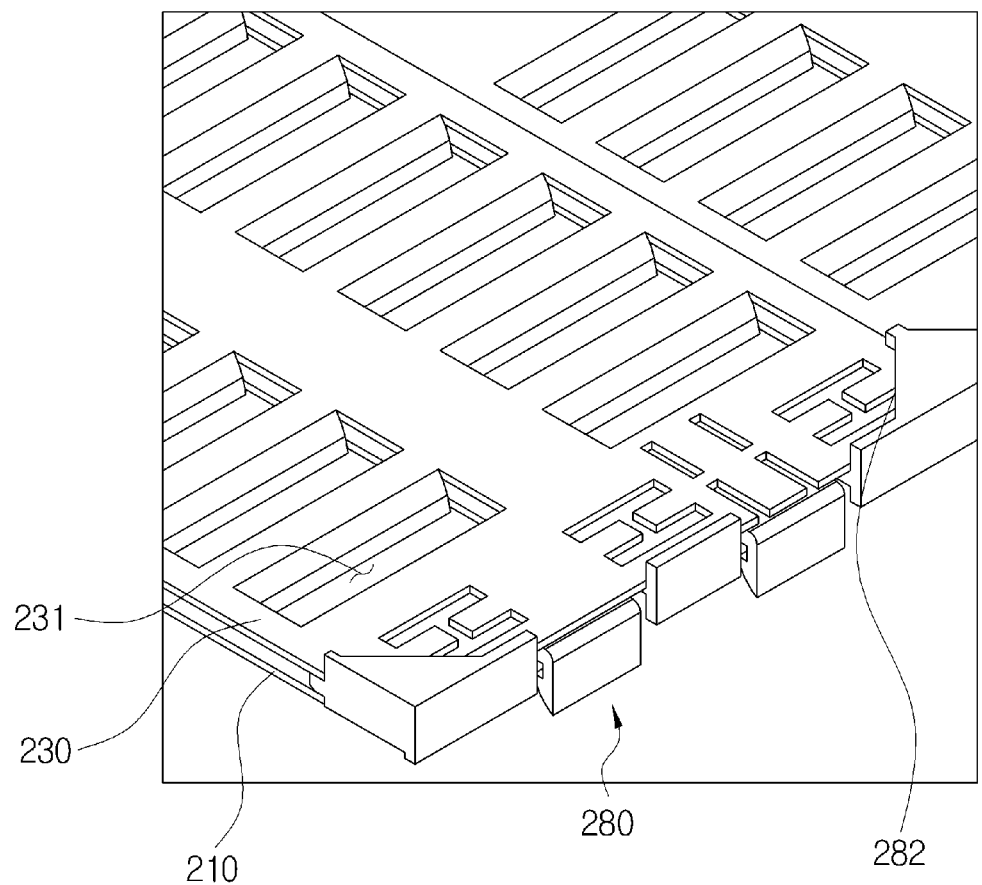
FIG. 26 is a perspective view illustrating a lower housing coupling part coupled with a first support of the heater for vehicles of FIG. 25.

FIGS. 25 and 26 illustrate an example of the heater for vehicles including a lower housing 280 coupled with the first support part 210 and the second support part 230 at an opposite side provided with the housing 240.

In the heater 1000 for vehicles according to the exemplary embodiment of the present invention, one side of the first support part 210 is inserted into the first groove part 281 formed on one side of the lower housing 280 in a width direction, both corners of the second support part 230 are fitted in the second groove part 282 formed on the other side of the lower housing 280 in a height direction, and the second protrusion 162 protruding from one side of the second plate part 161 of the second side plate 160 is inserted into the first groove part 282 together with the first support part 210.

In other words, one side of the lower housing 280 is provided with the first groove part 281 formed with a space as much as the width of the first support part 210 and the width of the second protrusion 162 of the second side plate 160 and the other side thereof is provided with the second groove part 282 having a diagonal rib shape in which both corners may be fitted in the height direction of the second support part 230, such that the lower housing 280 may be formed to couple the first support part 210, the second support part 230, and the second side plate 160 with each other.

Therefore, in the heater 1000 for vehicles according to the exemplary embodiment of the present invention, the first heater 100 and the second heater 200 may be assembled by the lower housing 280.

The heater 1000 for vehicles according to the exemplary embodiment of the present invention includes the PTC element 227 in which the second heater 200 includes the first support part 210 and the second support part 220 but may have the heat radiating unit 220 in a different structure from that illustrated in FIG. 14.

Various examples are illustrated in FIGS. 27 to 30.

Figure 27:
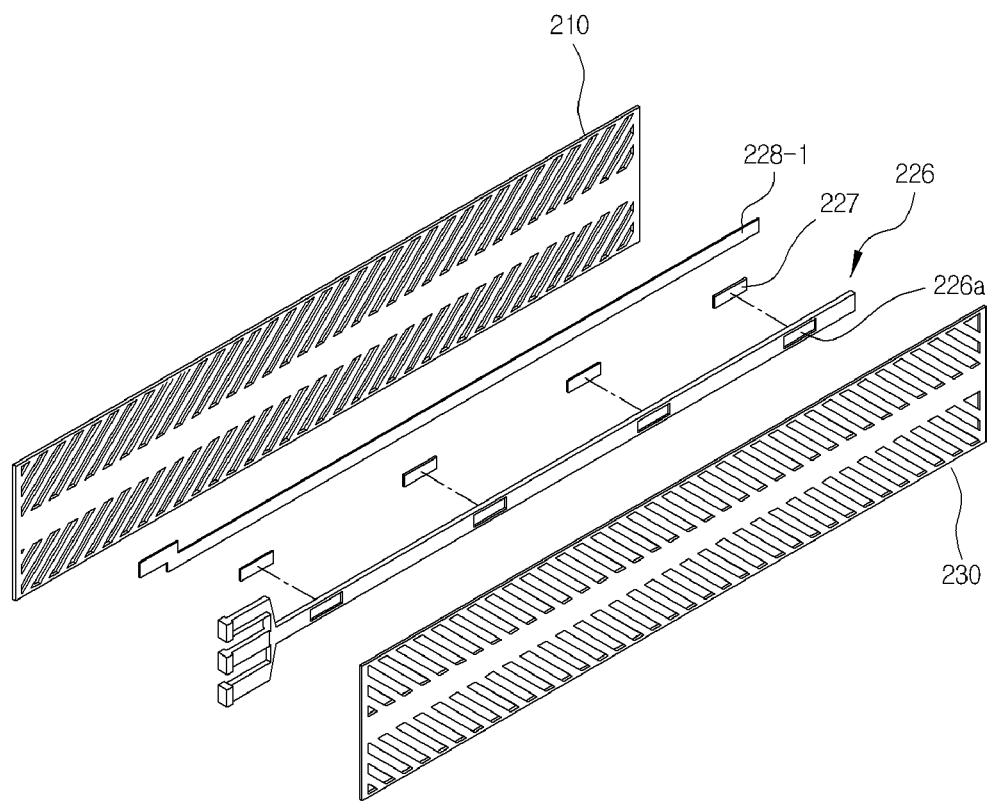
FIGS. 27 to 30 are diagrams illustrating a second heater heat radiating unit of the heater for vehicles according to the exemplary embodiment of the present invention.
Figure 28:
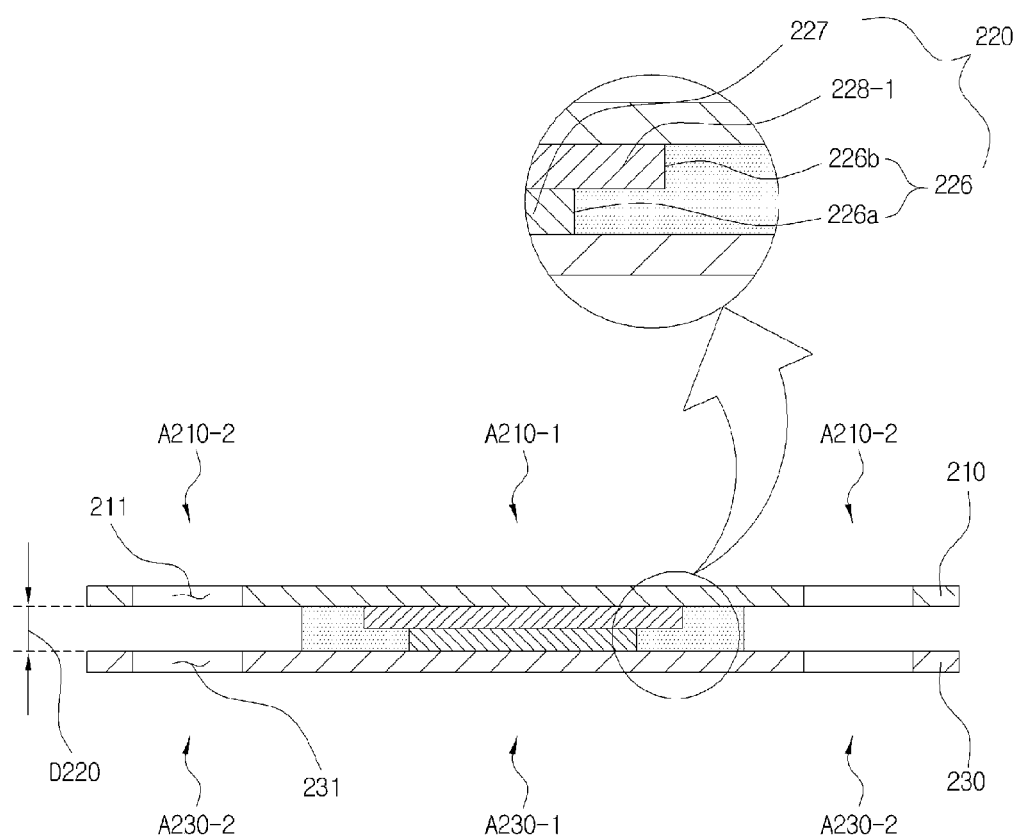

The heat radiating unit 220 is configured to include the PTC element 227, the insulating support 226, and a first electrode 228-1 (see FIGS. 27 and 28).

The insulating support 226 is a basic body forming the heat radiating unit 220 and a predetermined region of both sides contact the first heat radiating region A210-1 of the first support part 210 and the second heat radiating region A230-1 of the second support part 230.

The insulating support 226 is provided with the space part 226a hollowed or perforated to allow the PTC element 227 to be seated.

The heat radiating unit 220 as illustrated in FIGS. 27 and 28 are formed so that the second support part 230 directly contact the PTC element as a ground terminal and may be performed in the state in which the stability is secured.

Further, the PTC heater 200 according to the exemplary embodiment of the present invention may be formed with a first seating part 226b in which the first electrode 228-1 is seated by allowing the surface corresponding to the first heat radiating region A210-1 of the first support part 210 to be stepped to the space part 226a side.

That is, one side of the insulating support 226 contacts the first heat radiating region A210-1 of the first support part 210 together with the first electrode 228-1 and the other side thereof contacts the second heat radiating region A230-1 of the second support part 230 together with the PTC element 227.

To this end, the heat radiating unit 220 is formed so that the thickness of the first electrode 228-1 corresponds to a depth of the first seating part 226b and the height of the space part 226a corresponds to the thickness of the PTC element 227.

Figure 29:
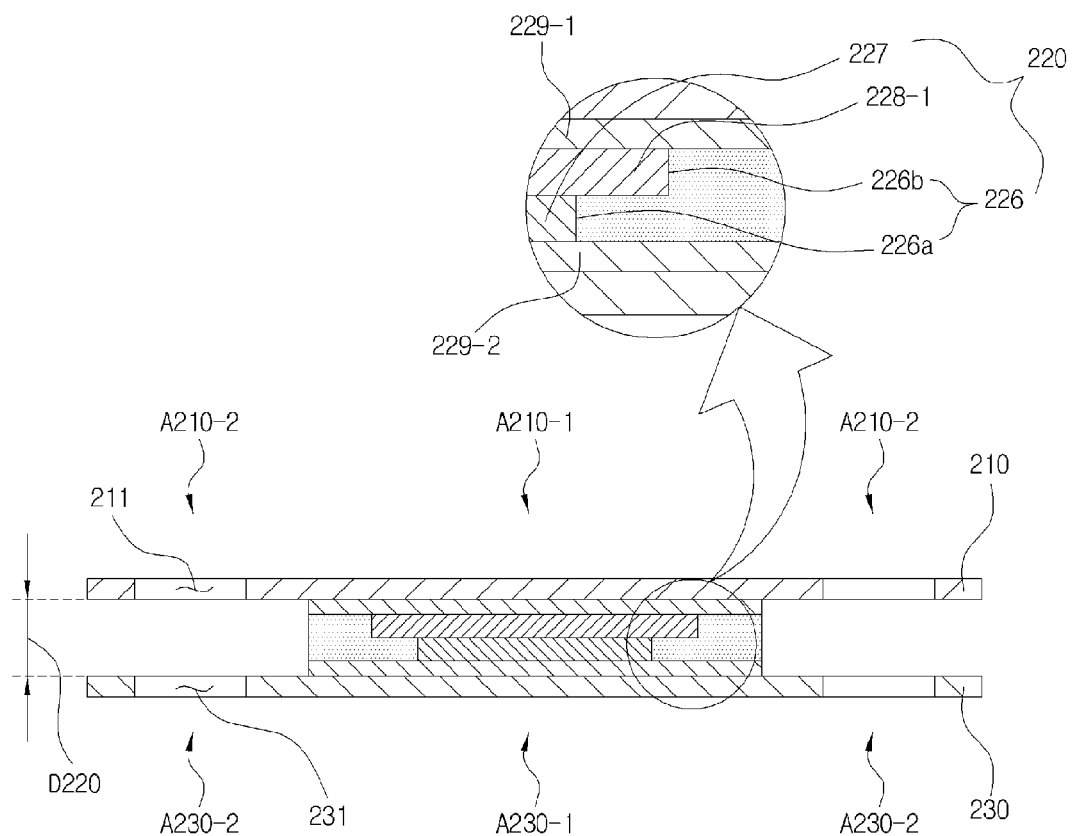

FIG. 29 illustrates an example in which another heat radiating unit 220 of the PTC heater 200 according to the exemplary embodiment of the present invention is formed and illustrates an example in which both sides contacting the first support part 210 and the second support part 230 of the heat radiating unit 220 are further provided with a first insulating layer 229-1 and a second insulating layer 229-2, respectively.

Figure 30:
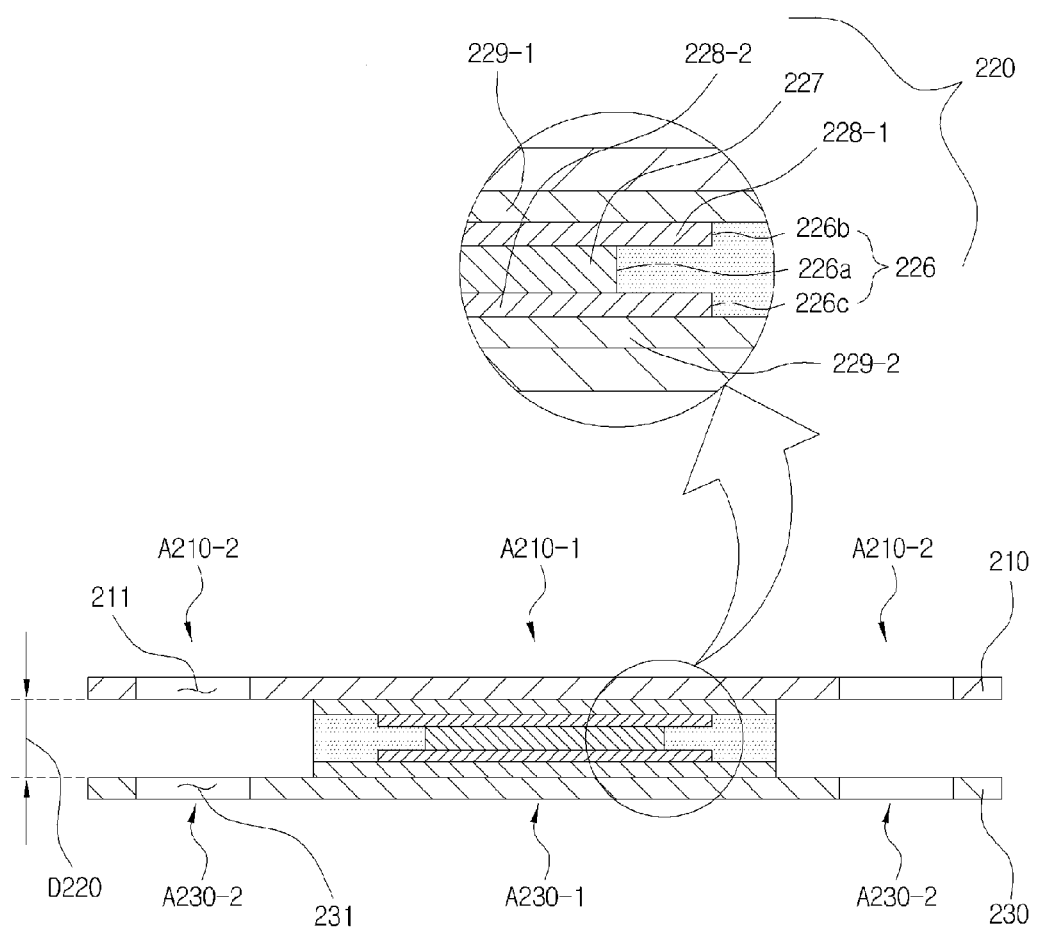

FIG. 30 illustrates an example in which another heat radiating unit 220 of the PTC heater 200 according to the exemplary embodiment of the present invention is formed and illustrates an example in which a surface corresponding to the second heat radiating region A230-1 of the insulating support 226 is provided with the second seating part 225 to be stepped to the space part 226a side and the second seating part 225 of the insulating support 226 is further seated with the second electrode 228-2.

When the second electrode 228-2 is provided, the thickness of the second electrode 228-2 and the depth of the second seating part 225 are formed to correspond to each other so that the other surface of the insulating support 226 contacts the heat radiating region of the second support part 230 together with the second electrode 228-2.

In this case, the insulating support 226 is formed to support the first electrode 228-1 and the second electrode 228-2.

Further, FIG. 30 illustrates an example in which each of the surfaces contacting the first support part 210 and the second support part 230 of the heat radiating unit 220 is further provided with the first insulating layer 229-1 and the second insulating layer 229-2.

Further, when the first electrode 228-1 and the second electrode 228-2 are provided together, it is preferable to facilitate the power supply connection by allowing the ends of the first electrode 228-1 and the second electrode 228-2 are formed to be stepped in different directions.

Figure 31:
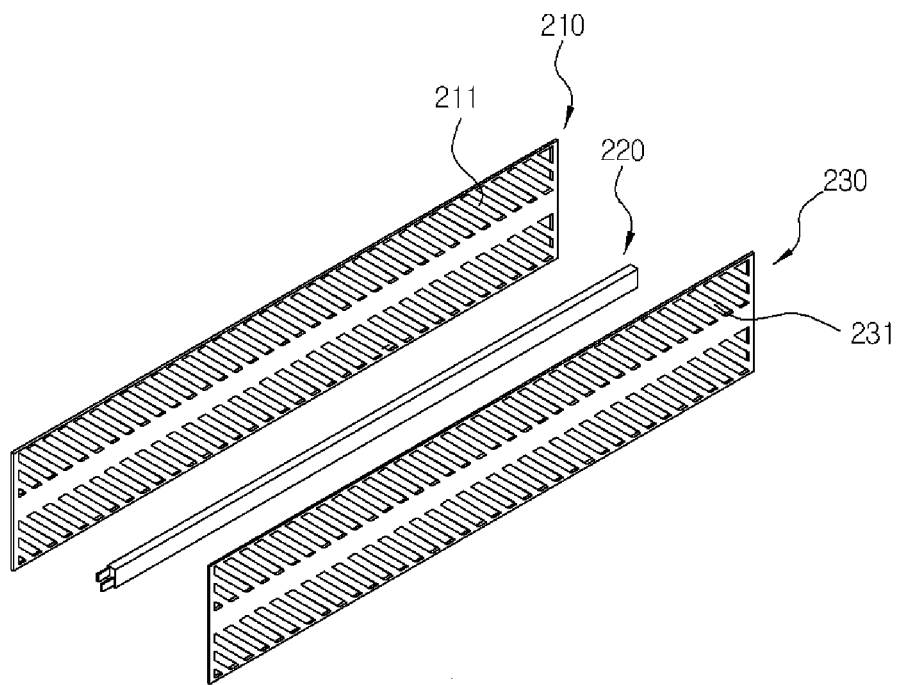
FIGS. 31 to 33 are diagrams illustrating various examples of a second heater of the heater for vehicles according to the exemplary embodiment of the present invention.
Figure 32:
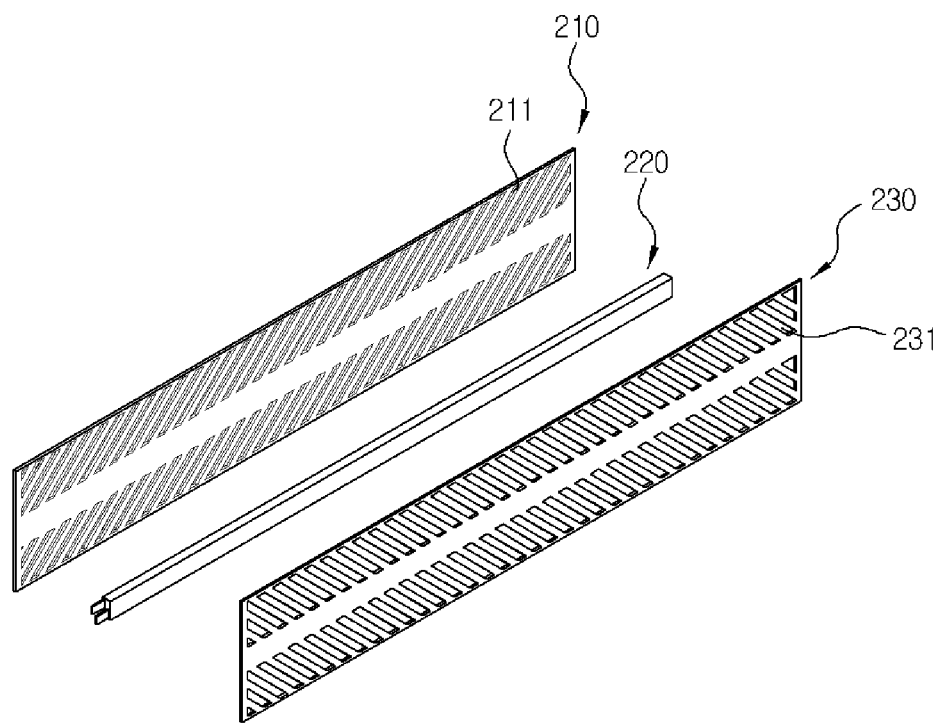
Figure 33:
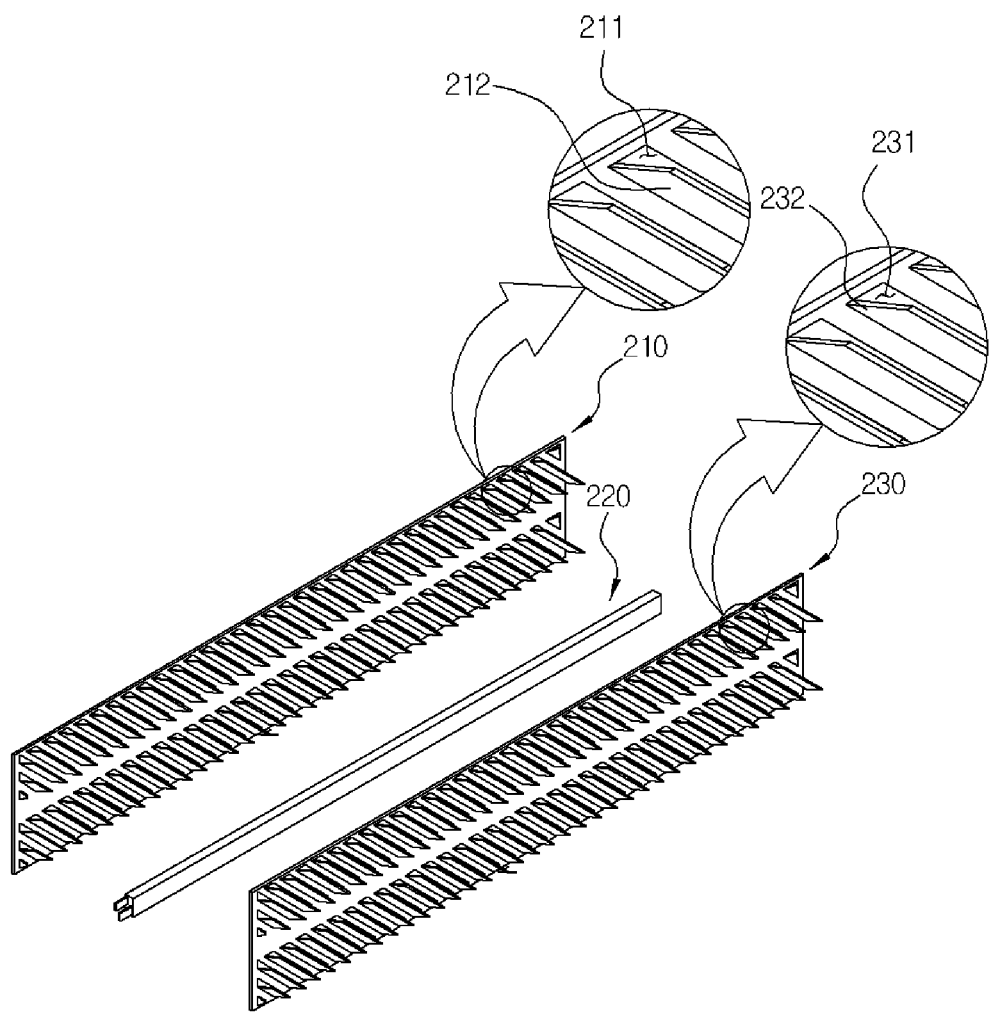

FIGS. 31 to 33 illustrate various types as a single module type of the first support part 210, the heat radiating unit 220, and the second support part 230.

FIG. 31 illustrates an example in which both of the first support part 210 and the second support part 230 are formed in the same size and form and the first hollow part 211 and the second hollow part 231 are inclined at the same angle.

FIG. 31 illustrates an example in which the first support part 210 and the second support part 230 have a similar form and the first hollow part 211 and the second hollow part 231 are folded only in the predetermined region as illustrated in FIGS. 22 and 24.

FIG. 33 illustrates a similar structure as the structure illustrated in FIG. 31 but an example in which the first hollow 211 part of the first support part 210 is provided with a first louver fin 212 and the second hollow part 231 of the second support part 230 is provided with a second louver fin 232.

The first louver fin 212 and the second louver fin 232 which protrude by cutting predetermined regions corresponding to the first support part 210 and the second support part 230, respectively and bending each cut region in a direction opposite to a side coupled with the first heater 100.

That is, the first louver fin 212 and the second louver fin 232 are configured to be integrally formed with the first support part 210 and the second support part 230 and have a structure extending from the first hollow part 211 and the second hollow part 231.

The formation of the first louver fin 212 and the second louver fin 232 may be simply formed by adding only the process of cutting only the rest portion other than the specific portion and bending the specific portion connected to the first support part 210 and the second support part 230, in the process of forming the first hollow part 211 and the second hollow part 231.

In other words, the heater 1000 for vehicles according to the exemplary embodiment of the present invention may be manufactured by a simple method and may more increase the contact area with air, by forming the first louver fin 212 and the second louver fin 232 using the region removed to form the first hollow part 211 and the second hollow part 231 in the second heater 200, thereby improving the overall heat exchange performance.

In this case, the protruding direction of the first louver fin 212 and the second louver fin 232 are formed in parallel with the air flow direction which is an opposite direction to a side coupled with the first heater 100 so as not to hinder the assembling performance of the first support part 210 and the first heater 100.

Therefore, the heater 1000 for vehicles according to the exemplary embodiment of the present invention includes the second heater 200 provided with the heat radiating unit 220 having the plate-shaped first support part 210 (and second support part 230) perpendicularly disposed to the air flow direction to facilitate the manufacturing and reduce the thickness, thereby implementing the miniaturization and more increasing the heat exchange performance to improve the heating performance and is fastened with the first heater 100 to increase the mounting performance and easily heat the whole introduced quantity of air.

Figure 34:
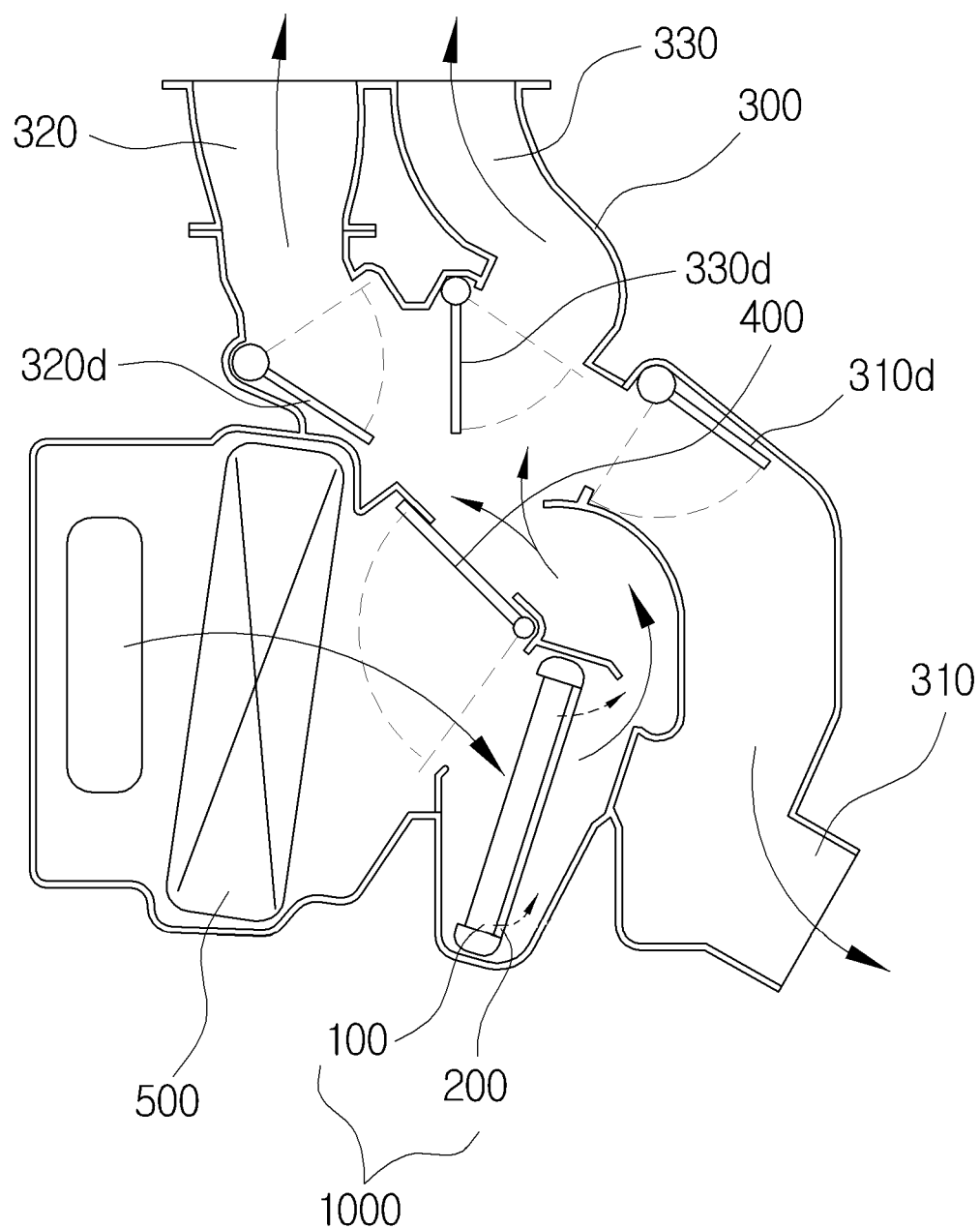
FIG. 34 is a diagram illustrating an air conditioning device provided with the heater for vehicles according to the exemplary embodiment of the present invention.

FIG. 34 illustrates the air conditioning device using the heater 1000 for vehicles according to the exemplary embodiment of the present invention.

The air conditioning device illustrated in FIG. 34 includes an air conditioning case 300 which is provided with a floor vent 310, a defrost vent 320, and a face vent 330 of which the opening/closing degree is controlled by each door 310d, 320d, and 330d, an evaporator 500 which is provided in the air conditioning case 300 to cool air, the heater 1000 for vehicles as described above, and a temperature door 400 which controls the open and close degree of a cooling air passage and a warming air passage.

That is, the air conditioning device using the heater 1000 for vehicles according to the exemplary embodiment of the present invention can more secure the heating performance by passing the whole quantity of introduced air through the first heater 100 and the second heater 200 and can be mounted in the air conditioning case 300 as a single component, thereby increasing the assembling performance and implementing the miniaturization.

As set forth above, according to the heater for vehicles according to the exemplary embodiment of the present invention, the first heater heated by the flowing of engine cooling water and the second heater heated by the power supply is integrally assembled, thereby increasing the spatial efficiency and more increasing the heat exchange performance to improve the heating performance.

In particular, according to the heater for vehicles according to the exemplary embodiment of the present invention, the first fixed part and the second fixed part is fixed to the first side plate and the second side plate without changing the first heater, thereby more improving the assembling performance by the fastening method using the first fixed hook.

Further, according to the heater for vehicles according to the exemplary embodiment of the present invention, each of the first support part and second support part of the second heater is formed corresponding to the tube and fin forming region of the first heater to perform the heat exchange while passing the whole quantity of air passing through the first heater through the second heater, thereby improving the heating performance.

Further, according to the heater for vehicles according to the exemplary embodiment of the present invention, the second heater forms the heat radiating unit using the plate-shaped first support part and second support part perpendicularly disposed in the air flow direction, thereby facilitating the manufacturing, reducing the thickness to implement the miniaturization, and more increasing the heat exchange performance to improve the heating performance.

Further, according to the heater for vehicles according to the exemplary embodiment of the present invention, the configuration of the second heater is simplified to improve the manufacturing performance, each of the first support part and second support part is integrally formed in a height direction to improve the manufacturing performance, and when the first support part and the heat radiating unit and/or second support part are formed in a module type, the number of modules is controlled depending on the change in the height direction to facilitate the design change.

Further, according to the heater for vehicles according to the exemplary embodiment of the present invention, when the second heater includes the heat radiating unit using the carbon nano tube, the heat radiating unit is directly coated on the first heat radiating region of the first support part, thereby facilitating the manufacturing, reducing the thickness, facilitating the control, and previously preventing the problems caused by the overheating to improve the safety.

Further, according to the heater for vehicles according to the exemplary embodiment of the present invention, when the second heater has the heat radiating unit as the heat radiating tube including the PTC element, the heat radiating tube including the insulating support, the PTC element, the first electrode and the second electrode is bonded to the first heat radiating region, thereby simplifying the manufacturing and heat is sufficiently radiated through the first support part, thereby previously preventing the problems caused by the overheating.

Further, according to the heater for vehicles according to the exemplary embodiment of the present invention, the second heater includes the PTC element, uses the plate-shaped first support part and second support part perpendicularly disposed to the air flow direction, and uses the heat radiating unit in a form in which the PTC element is supported by the insulating support, thereby simplifying the configuration to facilitate the manufacturing, reducing the thickness to implement the miniaturization and more increasing the heat exchange performance to improve the heating performance.

Further, according to the heater for vehicles according to the exemplary embodiment of the present invention, the second heater is further provided with the second support part to more secure the heat radiating region and the second support part supports both surfaces of the heat radiating unit together with the first support part, thereby improving the structural stability.

In this case, the second heater is formed so that the first perforated part formed on the first support part and the second perforated part formed on the second support part are folded with each other in the predetermined region in the air flow direction to make the flow of air turbulent, thereby improving the heat exchange performance of air.

Further, according to the heater for vehicles according to the exemplary embodiment of the present invention, the heat exchange area of the second heater is more increased and the first louver fin and the second louver fin guiding air are further provided, thereby maximizing the heat exchange performance.

The present invention is not limited to the above-mentioned exemplary embodiments, and may be variously applied, and may be variously modified without departing from the gist of the present invention claimed in the claims.

What is claimed is:

1. A heater for vehicles, comprising:
a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes; and
a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit,
wherein the first support part of the second heater is disposed adjacent to the plurality of tubes and the fins of the first heater, and
wherein the heat radiating part includes:
a heat radiating tube that is coupled with the first heat radiating region of the first support part;
an insulating support which is disposed in the heat radiating tube and includes a space part;
a positive temperature coefficient (PTC) element which is disposed in the space part of the insulating support; and
an electrode which is disposed in the insulating support.

2. The heater for vehicles of claim 1, further comprising:
a first side plate including a plate-shaped first plate part attached to one end of the first and second header tanks, respectively and a second side plate including a plate-shaped second plate part attached to another end of the first and second header tanks, respectively.

3. The heater for vehicles of claim 2, wherein the first side plate includes two protruded longitudinal portions respectively protruding from both longitudinal edges of the first plate part.

4. The heater for vehicles of claim 3, wherein one of the protruded longitudinal portions includes a first fastening part,
the housing includes a second fastening part disposed to correspond to the first fastening part, and
the first fastening part and the second fastening part are fastened with a fastener to fix the first heater and the second heater.

5. The heater for vehicles of claim 3, wherein the housing includes a fixed part fastened with one of the protruded longitudinal portions of the first side plate.

6. The heater for vehicles of claim 2, wherein the second side plate includes two protruded longitudinal portions protruding from both longitudinal edges of the second plate part.

7. The heater for vehicles of claim 2, wherein the second side plate extends to the second heater side to support one side of the second heater.

8. A heater for vehicles, comprising:
a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes; and
a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit,
wherein the first support part of the second heater is disposed adjacent to the plurality of tubes and the fins of the first heater, and
wherein the second heater includes upper and lower ends and includes a third fixed hook fixed to an outer circumferential surface of the first header tank or the second header tank.

9. A heater for vehicles, comprising:
a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes; and
a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit,
wherein the first support part of the second heater is disposed adjacent to the plurality of tubes and the fins of the first heater, and
wherein the second heater includes a fourth fixed hook fixed to the inlet pipe or the outlet pipe of the first heater and enclose a portion of the inlet pipe or the outlet pipe of the first heater.

10. A heater for vehicles, comprising:
a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes;
a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit; and
a second support part including a second heat radiating region which corresponds to a first heat radiating region of the first support part, a plurality of second holes disposed adjacent to the second heat radiating region, and a second air flow region corresponding to the first air flow region of the first support part,
wherein the first support part of the second heater is disposed adjacent to the plurality of tubes and the fins of the first heater, and
wherein the heat radiating unit is fixed to first and second supports parts at the first and second heat radiating regions respectively.

11. The heater for vehicles of claim 10, further comprising:
a first side plate including a plate-shaped first plate part attached to one end of the first and second header tanks, respectively and a second side plate including a plate-shaped second plate part attached to another end of the first and second header tanks, respectively.

12. The heater for vehicles of claim 11, further comprising:
a second fixed part fixed to a protrusion protruding from one edge of the second plate part of the second side plate, the second fixed party extending from an end of the second support part.

13. The heater for vehicles of claim 11, wherein the second side plate extends to the second heater side to support a side of the second heater.

14. The heater for vehicles of claim 11, further comprising:
a header extension extending from a header of the first header tank or the second header tank to the second heater,
wherein the header extension supports and fixes both ends of the second heater in a height direction.

15. The heater for vehicles of claim 11, further comprising:
a lower housing coupled with the first support part and the second support part,
a first groove part disposed on one side of the lower housing and attached with one side of the first support part in a length direction, and a second groove part disposed on another side of the lower housing and attached with both corners of the second support part in a height direction, wherein the second groove part is attached with a protrusion protruding to one side of the second plate part of the second side plate and attached with the first support part.

16. The heater for vehicles of claim 11, wherein the heat radiating part includes:
a PTC element;
an insulating support which includes a space part disposed to correspond to the first heat radiating region and the second heat radiating region, and is hollowed to receive the PTC element thereon; and
a first electrode which applies power to the PTC element.

17. The heater for vehicles of claim 16, wherein the heat radiating part includes a first seating part of which a surface corresponding to the first heat radiating region of the insulating support is stepped to the space part side, and the first electrode is seated in the first seating part of the insulating support.

18. The heater for vehicles of claim 17, wherein the heat radiating part includes a second seating part of which a surface corresponding to the second heat radiating region of the insulating support is stepped to the space part side, and the second seating part of the insulating support includes a second electrode.

19. The heater for vehicles of claim 16, wherein the heat radiating part includes:
a first insulating layer and a second insulating layer which are disposed on a contact surface of the first support part and the second support part.

20. A heater for vehicles, comprising:
a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes;
a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit; and
a second support part including a second heat radiating region which corresponds to a first heat radiating region of the first support part, a plurality of second holes disposed adjacent to the second heat radiating region, and a second air flow region corresponding to the first air flow region of the first support part,
wherein the first support part of the second heater is disposed adjacent to the plurality of tubes and the fins of the first heater, and
wherein the first support part and the second support part each include a first louver fin and a second louver fin which protrude by cutting predetermined regions corresponding to the first support part and the second support part, respectively and bending each cut region in a direction opposite to a side coupled with the first heater.

21. A heater for vehicles, comprising:
a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes;
a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit; and
a first side plate including a plate-shaped first plate part attached to the first and second header tanks on one side and a second side plate including a plate-shaped second plate part attached to the first and second header tanks on another side,
wherein the first support part of the second heater is disposed adjacent to the plurality of tubes and the fins of the first heater,
wherein the first side plate includes two protruded longitudinal portions respectively protruding from both longitudinal edges of the first plate part,
wherein the housing includes a fixed part fastened with one of the protruded longitudinal portions of the first side plate, and
wherein the fixed part is a groove into which the one of the protruded longitudinal portions of the first side plate is inserted.

22. A heater for vehicles, comprising:
a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes;
a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit; and
a first side plate including a plate-shaped first plate part attached to one end of the first and second header tanks, respectively, and a second side plate including a plate-shaped second plate part-attached to another end of the first and second header tanks, respectively,
wherein the first support part of the second heater is disposed adjacent to the plurality of tubes and the fins of the first heater,
wherein the first side plate includes two protruded longitudinal portions respectively protruding from both longitudinal edges of the first plate part, wherein the housing includes a fixed part fastened with one of the protruded longitudinal portions of the first side plate, and wherein the fixed part is a hook which is integrally attached to the housing.

23. A heater for vehicles, comprising:

a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes;

a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit; and a first side plate including a plate-shaped first plate part attached one end of the first and second header tanks, respectively, and a second side plate including a plate-shaped second plate part-attached to another end of the first and second header tanks, respectively, wherein the first support part of the second heater is disposed adjacent to the plurality of tubes and the fins of the first heater, wherein the second side plate includes two protruded longitudinal portions protruding from both longitudinal edges of the second plate part, and wherein the heater further includes a fixed body integrally attached to the first support part and a first fixed hook extending from the fixed body to be fixed to one of the two protruded longitudinal portions of the second side plate, and a second fixed part fixing an opposite side of the first support part to the first side plate.

24. A heater for vehicles, comprising:

a first heater which includes a first header tank and a second header tank spaced apart from each other by a predetermined distance, an inlet pipe and an outlet pipe which are respectively, alternately disposed at the first header tank and the second header tank to have cooling water introduced and discharged thereinto and therefrom, and a plurality of tubes disposed between the first and second header tanks and fixed to the first and second header tanks, a plurality of cooling water passages defined by the first, second header tanks and the plurality of tubes, and fins disposed between the plurality of tubes;

a second heater which includes a first support part having a plate shape perpendicular to an air flow direction and including a first heat radiating region and a first air flow region having a plurality of first holes, a heat radiating unit fixed to the first heat radiating region of the first support part to radiate heat, and a housing coupled to the first support part and one end of the heat radiating unit; and a first side plate including a plate-shaped first plate part attached to the first and second header tanks on one side and a second side plate including a plate-shaped second plate part attached to the first and second header tanks on another side, wherein the first support part of the second heater is disposed adjacent to the plurality of tubes and the fins of the first heater, and wherein the heater further includes a second fixed part which is a separate fixed clip fixing one side of the first support part to the second side plate.

* * * * *